US008736949B2

(12) United States Patent
Kothari et al.

(10) Patent No.: US 8,736,949 B2
(45) Date of Patent: May 27, 2014

(54) DEVICES AND METHODS FOR ENHANCING COLOR SHIFT OF INTERFEROMETRIC MODULATORS

(75) Inventors: Manish Kothari, Cupertino, CA (US); Gaurav Sethi, Dublin, CA (US); Jonathan Charles Griffiths, Fremont, CA (US); Eric Worthington, Redwood City, CA (US)

(73) Assignee: QUALCOMM MEMS Technologies, Inc., San Diego, CA (US)

(*) Notice: Subject to any disclaimer, the term of this patent is extended or adjusted under 35 U.S.C. 154(b) by 169 days.

(21) Appl. No.: 13/331,094

(22) Filed: Dec. 20, 2011

(65) Prior Publication Data

US 2012/0092749 A1 Apr. 19, 2012

Related U.S. Application Data

(60) Division of application No. 12/902,586, filed on Oct. 12, 2010, now Pat. No. 8,081,373, which is a continuation of application No. 12/220,947, filed on Jul. 29, 2008, now Pat. No. 7,813,029.

(60) Provisional application No. 60/962,796, filed on Jul. 31, 2007.

(51) Int. Cl.
*G02B 26/00* (2006.01)
*G02B 27/00* (2006.01)
*G02B 5/28* (2006.01)

(52) U.S. Cl.
USPC .......................... 359/291; 359/578; 359/589

(58) Field of Classification Search
CPC .. G02B 26/001; G02B 3/0043; G02B 3/0056; G02B 5/045

USPC ......... 359/290, 291, 292, 295, 578, 580, 584, 359/588, 589

See application file for complete search history.

(56) References Cited

U.S. PATENT DOCUMENTS

| | | | |
|---|---|---|---|
| 2,590,906 | A | 4/1952 | Tripp |
| 2,677,714 | A | 5/1954 | Auwarter; Max |
| 3,247,392 | A | 4/1966 | Thelen; Alfred J. |
| 3,679,313 | A | 7/1972 | Rosenberg |

(Continued)

FOREIGN PATENT DOCUMENTS

| | | |
|---|---|---|
| CN | 2056903 | 5/1990 |
| DE | 102006039071 | 2/2008 |

(Continued)

OTHER PUBLICATIONS

Office Action dated Feb. 22, 2012 in Chinese App. No. 200880101189.6.

(Continued)

*Primary Examiner* — David N Spector
(74) *Attorney, Agent, or Firm* — Knobbe Martens Olson & Bear LLP

(57) ABSTRACT

The color reflected by an interferometric modulator may vary as a function of the angle of view. A range of colors are thus viewable by rotating the interferometric modulator relative to an observer. By placing a textured layer between an observer and an interferometric modulator, a pattern which includes the range of colors may be viewed by the observer, and the range of colors may thus be viewable from a single viewing angle.

17 Claims, 25 Drawing Sheets

(56) References Cited

U.S. PATENT DOCUMENTS

| | | |
|---|---|---|
| 3,728,030 A | 4/1973 | Hawes |
| 3,886,310 A | 5/1975 | Guldberg et al. |
| 3,955,190 A | 5/1976 | Teraishi |
| 4,403,248 A | 9/1983 | Te Velde |
| 4,421,381 A | 12/1983 | Ueda et al. |
| 4,441,789 A | 4/1984 | Pohlack |
| 4,441,791 A | 4/1984 | Hornbeck |
| 4,497,974 A | 2/1985 | Deckman et al. |
| 4,498,953 A | 2/1985 | Cook et al. |
| 4,560,435 A | 12/1985 | Brown et al. |
| 4,655,554 A | 4/1987 | Armitage |
| 4,779,959 A | 10/1988 | Saunders |
| 4,786,128 A | 11/1988 | Birnbach |
| 4,859,060 A | 8/1989 | Katagiri et al. |
| 4,925,259 A | 5/1990 | Emmett |
| 4,954,789 A | 9/1990 | Sampsell |
| 4,956,619 A | 9/1990 | Hornbeck |
| 4,973,131 A | 11/1990 | Carnes |
| 4,982,184 A | 1/1991 | Kirkwood |
| 5,022,745 A | 6/1991 | Zayhowski et al. |
| 5,028,939 A | 7/1991 | Hornbeck et al. |
| 5,062,689 A | 11/1991 | Koehler |
| 5,091,983 A | 2/1992 | Lukosz |
| 5,096,279 A | 3/1992 | Hornbeck et al. |
| 5,170,283 A | 12/1992 | O'Brien et al. |
| 5,315,370 A | 5/1994 | Bulow |
| 5,381,232 A | 1/1995 | van Wijk |
| 5,452,138 A | 9/1995 | Mignardi et al. |
| 5,471,341 A | 11/1995 | Warde et al. |
| 5,526,172 A | 6/1996 | Kanack |
| 5,550,373 A | 8/1996 | Cole et al. |
| 5,559,358 A | 9/1996 | Burns et al. |
| 5,561,523 A | 10/1996 | Blomberg et al. |
| 5,597,736 A | 1/1997 | Sampsell |
| 5,600,383 A | 2/1997 | Hornbeck |
| 5,636,052 A | 6/1997 | Arney et al. |
| 5,646,729 A | 7/1997 | Koskinen et al. |
| 5,646,768 A | 7/1997 | Kaeriyama |
| 5,661,592 A | 8/1997 | Bornstein et al. |
| 5,665,997 A | 9/1997 | Weaver et al. |
| 5,699,181 A | 12/1997 | Choi |
| 5,710,656 A | 1/1998 | Goossen |
| 5,719,068 A | 2/1998 | Suzawa et al. |
| 5,734,177 A | 3/1998 | Sakamoto |
| 5,771,116 A | 6/1998 | Miller et al. |
| 5,786,927 A | 7/1998 | Greywall |
| 5,808,781 A | 9/1998 | Arney et al. |
| 5,818,095 A | 10/1998 | Sampsell |
| 5,825,528 A | 10/1998 | Goossen |
| 5,838,484 A | 11/1998 | Goossen |
| 5,867,302 A | 2/1999 | Fleming |
| 5,870,221 A | 2/1999 | Goossen |
| 5,914,804 A | 6/1999 | Goossen |
| 5,920,418 A | 7/1999 | Shiono et al. |
| 5,961,848 A | 10/1999 | Jacquet et al. |
| 6,028,689 A | 2/2000 | Michalicek et al. |
| 6,031,653 A | 2/2000 | Wang |
| 6,040,937 A | 3/2000 | Miles |
| 6,046,659 A | 4/2000 | Loo et al. |
| 6,055,090 A | 4/2000 | Miles |
| 6,100,861 A | 8/2000 | Cohen et al. |
| 6,124,851 A | 9/2000 | Jacobson |
| 6,242,932 B1 | 6/2001 | Hembree |
| 6,262,697 B1 | 7/2001 | Stephenson |
| 6,301,000 B1 | 10/2001 | Johnson |
| 6,323,987 B1 | 11/2001 | Rinaudo et al. |
| 6,327,071 B1 | 12/2001 | Kimura |
| 6,335,235 B1 | 1/2002 | Bhakta et al. |
| 6,351,329 B1 | 2/2002 | Greywall |
| 6,356,378 B1 | 3/2002 | Huibers |
| 6,369,947 B1 | 4/2002 | Staub et al. |
| 6,377,233 B2 | 4/2002 | Colgan et al. |
| 6,381,022 B1 | 4/2002 | Zavracky |
| 6,384,952 B1 | 5/2002 | Clark et al. |
| 6,400,738 B1 | 6/2002 | Tucker et al. |
| 6,433,917 B1 | 8/2002 | Mei et al. |
| 6,438,282 B1 | 8/2002 | Takeda et al. |
| 6,452,712 B2 | 9/2002 | Atobe et al. |
| 6,466,354 B1 | 10/2002 | Gudeman |
| 6,519,073 B1 | 2/2003 | Goossen |
| 6,556,338 B2 | 4/2003 | Han et al. |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,562 B1 | 1/2004 | Miles et al. |
| 6,680,792 B2 | 1/2004 | Miles |
| 6,698,295 B1 | 3/2004 | Sherrer |
| 6,710,908 B2 | 3/2004 | Miles et al. |
| 6,738,194 B1 | 5/2004 | Ramirez et al. |
| 6,768,555 B2 | 7/2004 | Chen et al. |
| 6,794,119 B2 | 9/2004 | Miles |
| 6,801,346 B2 | 10/2004 | Schilling et al. |
| 6,813,059 B2 | 11/2004 | James et al. |
| 6,815,065 B2 | 11/2004 | Argoitia et al. |
| 6,836,366 B1 | 12/2004 | Flanders et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,862,127 B1 | 3/2005 | Ishii |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,912,022 B2 | 6/2005 | Lin et al. |
| 6,913,942 B2 | 7/2005 | Patel et al. |
| 6,924,934 B2 | 8/2005 | Schilling et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,960,305 B2 | 11/2005 | Doan et al. |
| 6,975,438 B2 | 12/2005 | Schilling et al. |
| 6,980,350 B2 | 12/2005 | Hung et al. |
| 6,982,820 B2 | 1/2006 | Tsai |
| 7,002,726 B2 | 2/2006 | Patel et al. |
| 7,006,272 B2 | 2/2006 | Tsai |
| 7,009,754 B2 | 3/2006 | Huibers |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,072,093 B2 | 7/2006 | Piehl et al. |
| 7,113,339 B2 | 9/2006 | Taguchi et al. |
| 7,119,945 B2 | 10/2006 | Kothari et al. |
| 7,123,216 B1 | 10/2006 | Miles |
| 7,126,738 B2 | 10/2006 | Miles |
| 7,130,104 B2 | 10/2006 | Cummings |
| 7,184,195 B2 | 2/2007 | Yang |
| 7,184,202 B2 | 2/2007 | Miles et al. |
| 7,198,973 B2 | 4/2007 | Lin et al. |
| 7,221,495 B2 | 5/2007 | Miles et al. |
| 7,236,284 B2 | 6/2007 | Miles |
| 7,245,285 B2 | 7/2007 | Yeh et al. |
| 7,289,259 B2 | 10/2007 | Chui et al. |
| 7,302,157 B2 | 11/2007 | Chui |
| 7,321,456 B2 | 1/2008 | Cummings |
| 7,321,457 B2 | 1/2008 | Heald |
| 7,327,510 B2 | 2/2008 | Cummings et al. |
| 7,372,613 B2 | 5/2008 | Chui et al. |
| 7,372,619 B2 | 5/2008 | Miles |
| 7,385,744 B2 | 6/2008 | Kogut et al. |
| 7,385,762 B2 | 6/2008 | Cummings |
| 7,400,488 B2 | 7/2008 | Lynch et al. |
| 7,405,852 B2 | 7/2008 | Brosnihan et al. |
| 7,417,746 B2 | 8/2008 | Lin et al. |
| 7,420,725 B2 | 9/2008 | Kothari |
| 7,436,573 B2 | 10/2008 | Doan et al. |
| 7,459,402 B2 | 12/2008 | Doan et al. |
| 7,460,291 B2 | 12/2008 | Sampsell et al. |
| 7,460,292 B2 | 12/2008 | Chou |
| 7,476,327 B2 | 1/2009 | Tung et al. |

(56) References Cited

U.S. PATENT DOCUMENTS

| | | | |
|---|---|---|---|
| 7,477,440 B1 | 1/2009 | Huang | |
| 7,492,503 B2 | 2/2009 | Chui | |
| 7,508,566 B2 | 3/2009 | Feenstra et al. | |
| 7,515,327 B2* | 4/2009 | Cummings | 359/290 |
| 7,527,995 B2 | 5/2009 | Sampsell | |
| 7,532,377 B2 | 5/2009 | Miles | |
| 7,535,621 B2 | 5/2009 | Chiang | |
| 7,542,198 B2 | 6/2009 | Kothari | |
| 7,550,794 B2 | 6/2009 | Miles et al. | |
| 7,550,810 B2 | 6/2009 | Mignard et al. | |
| 7,554,711 B2 | 6/2009 | Miles | |
| 7,554,714 B2 | 6/2009 | Chui et al. | |
| 7,561,321 B2 | 7/2009 | Heald | |
| 7,564,612 B2 | 7/2009 | Chui | |
| 7,566,664 B2 | 7/2009 | Yan et al. | |
| 7,567,373 B2 | 7/2009 | Chui et al. | |
| 7,569,488 B2 | 8/2009 | Rafanan | |
| 7,612,932 B2 | 11/2009 | Chui et al. | |
| 7,629,197 B2 | 12/2009 | Luo et al. | |
| 7,630,119 B2 | 12/2009 | Tung et al. | |
| 7,630,121 B2 | 12/2009 | Endisch et al. | |
| 7,630,123 B2 | 12/2009 | Kothari | |
| 7,643,199 B2 | 1/2010 | Lan | |
| 7,643,202 B2 | 1/2010 | Sasagawa | |
| 7,649,671 B2 | 1/2010 | Kothari et al. | |
| 7,663,794 B2 | 2/2010 | Cummings | |
| 7,672,035 B2 | 3/2010 | Sampsell et al. | |
| 7,692,844 B2 | 4/2010 | Miles | |
| 7,704,772 B2 | 4/2010 | Tung et al. | |
| 7,715,085 B2 | 5/2010 | Sasagawa | |
| 7,719,500 B2 | 5/2010 | Chui | |
| 7,738,157 B2 | 6/2010 | Miles | |
| 7,742,220 B2 | 6/2010 | Kogut et al. | |
| 7,782,517 B2 | 8/2010 | Griffiths et al. | |
| 7,782,523 B2 | 8/2010 | Ishii | |
| 7,787,173 B2 | 8/2010 | Chui | |
| 7,808,694 B2 | 10/2010 | Miles | |
| 7,813,029 B2 | 10/2010 | Kothari et al. | |
| 7,826,120 B2 | 11/2010 | Miles | |
| 7,830,586 B2 | 11/2010 | Miles | |
| 7,830,587 B2 | 11/2010 | Miles | |
| 7,830,588 B2 | 11/2010 | Miles | |
| 7,835,061 B2 | 11/2010 | Kogut et al. | |
| 7,839,557 B2 | 11/2010 | Chui et al. | |
| 7,851,054 B2 | 12/2010 | Weber et al. | |
| 7,852,544 B2 | 12/2010 | Sampsell et al. | |
| 7,852,545 B2 | 12/2010 | Miles | |
| 7,898,722 B2 | 3/2011 | Miles | |
| 8,081,373 B2 | 12/2011 | Kothari et al. | |
| 2001/0003487 A1 | 6/2001 | Miles | |
| 2001/0028503 A1 | 10/2001 | Flanders et al. | |
| 2001/0043171 A1 | 11/2001 | Van Gorkom et al. | |
| 2002/0070931 A1 | 6/2002 | Ishikawa | |
| 2002/0075555 A1 | 6/2002 | Miles | |
| 2002/0126364 A1 | 9/2002 | Miles | |
| 2002/0146200 A1 | 10/2002 | Kudrle et al. | |
| 2002/0149834 A1 | 10/2002 | Mei et al. | |
| 2002/0154422 A1 | 10/2002 | Sniegowski et al. | |
| 2002/0197761 A1 | 12/2002 | Patel et al. | |
| 2003/0011864 A1 | 1/2003 | Flanders | |
| 2003/0016428 A1 | 1/2003 | Kato et al. | |
| 2003/0035196 A1 | 2/2003 | Walker | |
| 2003/0043157 A1 | 3/2003 | Miles | |
| 2003/0053078 A1 | 3/2003 | Missey et al. | |
| 2003/0119221 A1 | 6/2003 | Cunningham et al. | |
| 2003/0123125 A1 | 7/2003 | Little | |
| 2003/0138669 A1 | 7/2003 | Kojima et al. | |
| 2003/0173504 A1 | 9/2003 | Cole et al. | |
| 2003/0202265 A1 | 10/2003 | Reboa et al. | |
| 2003/0202266 A1 | 10/2003 | Ring et al. | |
| 2004/0008396 A1 | 1/2004 | Stappaerts | |
| 2004/0008438 A1 | 1/2004 | Sato | |
| 2004/0027671 A1 | 2/2004 | Wu et al. | |
| 2004/0027672 A1 | 2/2004 | Bourdelais et al. | |
| 2004/0027701 A1 | 2/2004 | Ishikawa | |
| 2004/0043552 A1 | 3/2004 | Strumpell et al. |
| 2004/0066477 A1 | 4/2004 | Morimoto et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0188599 A1 | 9/2004 | Viktorovitch et al. |
| 2004/0207897 A1 | 10/2004 | Lin |
| 2004/0209195 A1 | 10/2004 | Lin |
| 2004/0217264 A1 | 11/2004 | Wood et al. |
| 2004/0217919 A1 | 11/2004 | Piehl et al. |
| 2004/0259010 A1 | 12/2004 | Kanbe |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0078348 A1 | 4/2005 | Lin |
| 2005/0117190 A1 | 6/2005 | Iwauchi et al. |
| 2005/0117623 A1 | 6/2005 | Shchukin et al. |
| 2005/0128543 A1 | 6/2005 | Phillips et al. |
| 2005/0133761 A1 | 6/2005 | Thielemans |
| 2005/0168849 A1 | 8/2005 | Lin |
| 2005/0179378 A1 | 8/2005 | Oooka et al. |
| 2005/0195462 A1 | 9/2005 | Lin |
| 2005/0275930 A1 | 12/2005 | Patel et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0038643 A1 | 2/2006 | Xu et al. |
| 2006/0065940 A1 | 3/2006 | Kothari |
| 2006/0066640 A1 | 3/2006 | Kothari et al. |
| 2006/0066641 A1 | 3/2006 | Gally et al. |
| 2006/0077155 A1 | 4/2006 | Chui et al. |
| 2006/0077156 A1 | 4/2006 | Chui et al. |
| 2006/0077522 A1 | 4/2006 | Kothari |
| 2006/0082588 A1 | 4/2006 | Mizuno et al. |
| 2006/0082863 A1 | 4/2006 | Piehl et al. |
| 2006/0132927 A1 | 6/2006 | Yoon |
| 2006/0180886 A1 | 8/2006 | Tsang |
| 2006/0220160 A1 | 10/2006 | Miles |
| 2007/0020948 A1 | 1/2007 | Piehl et al. |
| 2007/0077525 A1 | 4/2007 | Davis et al. |
| 2007/0086078 A1 | 4/2007 | Hagood et al. |
| 2007/0097694 A1 | 5/2007 | Faase et al. |
| 2007/0121118 A1 | 5/2007 | Gally et al. |
| 2007/0138608 A1 | 6/2007 | Ikehashi |
| 2007/0153860 A1 | 7/2007 | Chang-Hasnain et al. |
| 2007/0177247 A1 | 8/2007 | Miles |
| 2007/0216987 A1 | 9/2007 | Hagood et al. |
| 2007/0253054 A1 | 11/2007 | Miles |
| 2007/0285761 A1 | 12/2007 | Zhong et al. |
| 2008/0002299 A1 | 1/2008 | Thurn |
| 2008/0013145 A1 | 1/2008 | Chui et al. |
| 2008/0030657 A1 | 2/2008 | Wu et al. |
| 2008/0055706 A1 | 3/2008 | Chui et al. |
| 2008/0068697 A1 | 3/2008 | Haluzak et al. |
| 2008/0080043 A1 | 4/2008 | Chui et al. |
| 2008/0088910 A1 | 4/2008 | Miles |
| 2008/0110855 A1 | 5/2008 | Cummings |
| 2008/0186581 A1 | 8/2008 | Bita et al. |
| 2008/0297880 A1 | 12/2008 | Steckl et al. |
| 2009/0021884 A1 | 1/2009 | Nakamura |
| 2009/0201566 A1 | 8/2009 | Kothari |
| 2009/0211885 A1 | 8/2009 | Steeneken et al. |
| 2009/0213450 A1 | 8/2009 | Sampsell |
| 2009/0213451 A1 | 8/2009 | Tung et al. |
| 2009/0256218 A1 | 10/2009 | Mignard et al. |
| 2009/0273823 A1 | 11/2009 | Tung et al. |
| 2009/0273824 A1 | 11/2009 | Sasagawa |
| 2009/0279162 A1 | 11/2009 | Chui |

(56) References Cited

U.S. PATENT DOCUMENTS

| | | | |
|---|---|---|---|
| 2009/0279174 A1 | 11/2009 | Miles et al. | |
| 2010/0080890 A1 | 4/2010 | Tung et al. | |
| 2010/0085626 A1 | 4/2010 | Tung et al. | |
| 2010/0118382 A1 | 5/2010 | Kothari et al. | |
| 2010/0128337 A1 | 5/2010 | Tung | |
| 2010/0236624 A1 | 9/2010 | Khazeni et al. | |
| 2011/0019380 A1 | 1/2011 | Miles | |
| 2011/0026096 A1 | 2/2011 | Miles | |
| 2011/0038027 A1 | 2/2011 | Miles | |
| 2011/0044496 A1 | 2/2011 | Chui et al. | |
| 2011/0080632 A1 | 4/2011 | Miles | |
| 2011/0116156 A1 | 5/2011 | Kothari | |
| 2013/0100003 A1* | 4/2013 | Gally et al. | 345/85 |

FOREIGN PATENT DOCUMENTS

| | | |
|---|---|---|
| EP | 0668490 A2 | 8/1995 |
| EP | 0695959 A1 | 2/1996 |
| EP | 0879991 A2 | 11/1998 |
| EP | 0969306 A1 | 1/2000 |
| EP | 0986077 A2 | 3/2000 |
| EP | 1122577 A2 | 8/2001 |
| EP | 1205782 A2 | 5/2002 |
| EP | 1227346 A2 | 7/2002 |
| EP | 1275997 A2 | 1/2003 |
| EP | 1403212 A2 | 3/2004 |
| EP | 1473581 A2 | 11/2004 |
| EP | 1 847 862 | 10/2007 |
| EP | 1928028 A1 | 6/2008 |
| JP | 56088111 | 7/1981 |
| JP | 05049238 | 2/1993 |
| JP | 05281479 | 10/1993 |
| JP | 8051230 A | 2/1996 |
| JP | 11211999 A | 8/1999 |
| JP | 2000147262 A | 5/2000 |
| JP | 2001221913 A | 8/2001 |
| JP | 2001249283 A | 9/2001 |
| JP | 2002062490 A | 2/2002 |
| JP | 2002221678 A | 8/2002 |
| JP | 2002530713 A | 9/2002 |
| JP | 2003504680 A | 2/2003 |
| JP | 2003177336 A | 6/2003 |
| JP | 2003340795 A | 12/2003 |
| JP | 2004012642 A | 1/2004 |
| JP | 2004070328 A | 3/2004 |
| JP | 2004212638 A | 7/2004 |
| JP | 2004212680 A | 7/2004 |
| JP | 2005279831 A | 10/2005 |
| JP | 2005308871 A | 11/2005 |
| JP | 2007027150 A | 2/2007 |
| WO | WO-9814804 A1 | 4/1998 |
| WO | WO-031572 A1 | 6/2000 |
| WO | WO 01/03945 | 1/2001 |
| WO | WO 01/53113 | 7/2001 |
| WO | WO-02024570 A1 | 3/2002 |
| WO | WO-02086582 A1 | 10/2002 |
| WO | WO-03105198 A1 | 12/2003 |
| WO | WO 2006/007742 | 1/2006 |
| WO | WO 2006/036440 | 4/2006 |
| WO | WO-2006035698 A1 | 4/2006 |
| WO | WO-007036422 | 4/2007 |
| WO | WO-2007045875 A1 | 4/2007 |
| WO | WO-2007053438 A1 | 5/2007 |
| WO | WO-2007072998 A1 | 6/2007 |
| WO | WO-2008062363 A2 | 5/2008 |

OTHER PUBLICATIONS

Office Action dated Aug. 10, 2012 in Chinese App. No. 200880101189.6.
ISR and WO dated Oct. 21, 2008 in PCT/US08/071501.
IPRP dated Oct. 28, 2009 in PCT/US08/071501.
Official Action dated May 9, 2011 in European App. No. 08782505.5.
Office Action dated Apr. 6, 2011 in Chinese App. No. 200880101189.6.
Office Action dated Jan. 25, 2010 in U.S. Appl. No. 12/220,947.
Office Action dated Apr. 20, 2011 in U.S. Appl. No. 12/902,586.
Notice of Reasons for Rejection dated Jan. 4, 2012 in Japanese App. No. 2010-520137.
Official Action dated Jun. 1, 2012 in European App. No. 08782505.5.
Billard C, "Tunable Capacitor," 5th Annual Review of LETI, 2003, 7 pages.
Conner, "Hybrid Color Display using Optical Interference Filter Array," SID Digest, 1993, 577-580.
Feenstra, et al., "Electrowetting displays," Liquavista Bv, Jan. 2006, 16 pp.
Hohlfeld, et al., "Micro-Machined Tunable Optical Filters With Optimized Band-Pass Spectrum," 12th International Conference on Transducers, Solid-State Sensors, Actuators and Microsystems, 2003, vol. 2, 1494-1497.
Jerman, et al., "A Miniature Fabry-Perot Interferometer Fabricated Using Silicon Micromachining Techniques," IEEE Electron Devices Society, 1988.
Jerman, et al., "Miniature Fabry-Perot Interferometers Micromachined in Silicon for use in Optical Fiber WDM Systems," Transducers, Proceedings on the International Conference on Solid State Sensors and Actuators, 1991, vol. ConF. 6, San Francisco, 372-375.
Kowarz, et al., "Conformal Grating Electromechanical System (Gems) for High-Speed Digital Light Modulation," Proceedings of the IEEE 15th Annual International Conference on Micro Electro Mechanical Systems, MEMS 2002, pp. 568-573.
Lezec, "Submicrometer Dimple Array Based Interference Color Field Displays and Sensors," Nano Letters, 2006, 7(2), 329-333.
Londergan, et al., "Advanced processes for MEMS-based displays," Proceedings of the Asia Display, 2007, SID, 1, 107-112.
Longhurst R.S., "Geometrical and Physical Optics", Chapter IX: Multiple Beam Interferometry, pp. 153-157, 1963.
Mehregany, et al., "MEMS Applications in Optical Systems," IEEE/Leos 1996 Summer Topical Meetings, 1996, 75-76.
Miles M.W., "A MEMS Based Interferometric Modulator (IMOD) for Display Applications" Proceedings of Sensors Expo, 21 Oct. 1997 © 1997 Helmer's Publishing, Inc. (Oct. 21, 1097), pp. 281-284 XP009058455.
Miles M.W., "A New Reflective FPD Technology using Interferometric Modulation," Journal of the SID, 1997, vol. 5(4), 379-382.
Miles M.W., et al., "Interferometric Modulation MEMS as an enabling technology for high-performance reflective displays," Proceedings of the SPIE, 2003, 4985, 131-139.
Nakagawa et al., "Wide-Field-of-View Narrow-Band Spectral Filters Based on Photonic Crystal Nanocavities", Optical Society of America, Optics Letters, vol. 27, No. 3, pp. 191-193, Feb. 1, 2002.
Nieminen, et al., "Design of a Temperature-Stable RF MEMS Capacitor," Institute of Electrical and Electronics Engineers (IEEE) Journal of Microelectromechanical Systems, 2004, vol. 13(5), 705-714.
Pape, et al., "Characteristics of the Deformable Mirror Device for Optical Information Processing", Optical Engineering, Nov.-Dec. 1983, 22(6), 676-681.
Tai C.Y. et al., "A Transparent Sheet Display By Plastic MEMS", Journal of the SID, 2006, vol. 14 (8), 735-741.
Tolansky, "Multiple-Beam Interference in Multiple-Beam Interfermetry of Surfaces and Films", Chap II Oxford at the Clarendon Press, 1948, pp. 8-11.
Wang, et al., "Design and Fabrication of a Novel TWO-Dimension MEMS-Based Tunable Capacitor", IEEE International Conference on Communications, Circuits and Systems and West Sino Expositions, 2002, vol. 2, 1766-1769.

* cited by examiner

|  | Column Output Signals | |
|---|---|---|
|  | $+V_{bias}$ | $-V_{bias}$ |
| Row Output Signals   0 | Stable | Stable |
| $+\Delta V$ | Relax | Actuate |
| $-\Delta V$ | Actuate | Relax |

US 8,736,949 B2

DEVICES AND METHODS FOR ENHANCING COLOR SHIFT OF INTERFEROMETRIC MODULATORS

CROSS-REFERENCE TO RELATED APPLICATIONS

This application is a divisional of U.S. patent application Ser. No. 12/902,586, filed Oct. 12, 2010, and scheduled to issue on Dec. 20, 2011 as U.S. Pat. No. 8,081,373, which is a continuation of U.S. patent application Ser. No. 12/220,947, filed Jul. 29, 2008, now issued as U.S. Pat. No. 7,813,029, which claims priority to U.S. Provisional Patent Application No. 60/962,796, filed Jul. 31, 2007, each of which is hereby incorporated by reference in its entirety.

BACKGROUND OF THE INVENTION

1. Field of the Invention

This invention relates to Microelectromechanical systems (MEMS) and similar devices, such as static interferometric devices.

2. Description of the Related Art

Microelectromechanical systems include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. In another embodiment, both plates are fixed relative to one another to form an interferometric stack. Such devices have a wide range of applications, and it would be beneficial in the art to utilize and/or modify the characteristics of these types of devices so that their features can be exploited in improving existing products and creating new products that have not yet been developed

SUMMARY OF THE INVENTION

In one embodiment, an assembly is provided, including an interferometric modulator stack, including an absorber layer which is at least partially transmissive to incident light, a reflective layer fixed relative to the absorber layer, and a spacer layer disposed between the absorber layer and the reflective layer and defining an interferometric gap within the interferometric modulator stack, and a textured layer disposed on the side of the absorber layer opposite the reflective layer.

In another embodiment, an optical structure is provided, including a display element, where the wavelengths of light reflected by the display element are a function of the angle of view, and an overlying layer including a surface having a substantially random texture, where the textured surface forms a boundary between a first material having a first index of refraction and a second material having a second index of refraction, and where light reflected by the display element is refracted at the textured surface to vary the effective angle of view over the display element.

In another embodiment, a display element is provided, including an interferometric modulator, the interferometric modulator including an absorber, and a reflector underlying the absorber layer, and an additional layer including at least one optical feature, the additional layer overlying a uniform portion of the interferometric modulator in which the absorber layer is separated from the reflector by a substantially uniform distance, where light reflected from a first point in the uniform portion to a viewer includes a first peak wavelength of light and light reflected from a second point in the uniform portion to the viewer includes a second peak wavelength of light, the first peak wavelength being different from the second peak wavelength, where neither of the first or second peak wavelengths of light includes a harmonic of the other.

In one embodiment, an optical structure is provided, including means for interferometrically modulating light, where the color reflected by the modulating means varies as a function of angle of view, and means for refracting light reflected by the modulating means to vary the effective angle of view over the modulating means.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENT

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety devices or components, including but not limited to architectural or aesthetic structures, such as tiling or other decorative panels, or coatings. In other embodiments, they may be used in conjunction with display devices, including but not limited to wireless devices, hand-held or portable computers, wrist watches, clocks, or electronic billboards or signs.

In certain embodiments, it is aesthetically desirable to utilize the color shift properties of an interferometric modulator to provide a desired optical output. This optical output can be modified through the positioning of a textured layer between an observer and the interferometric modulator. A static interferometric modulator may be used in certain embodiments.

Figure 1:
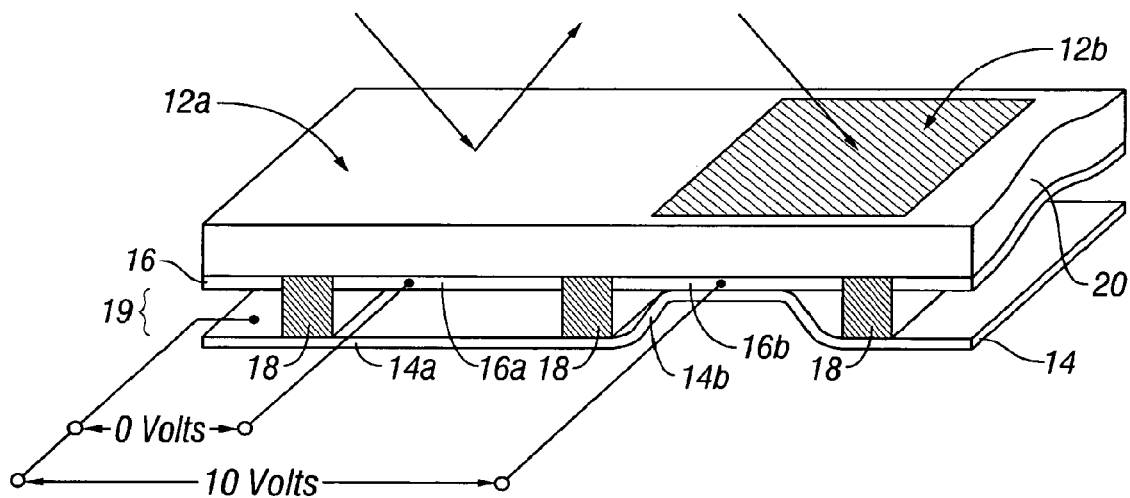
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
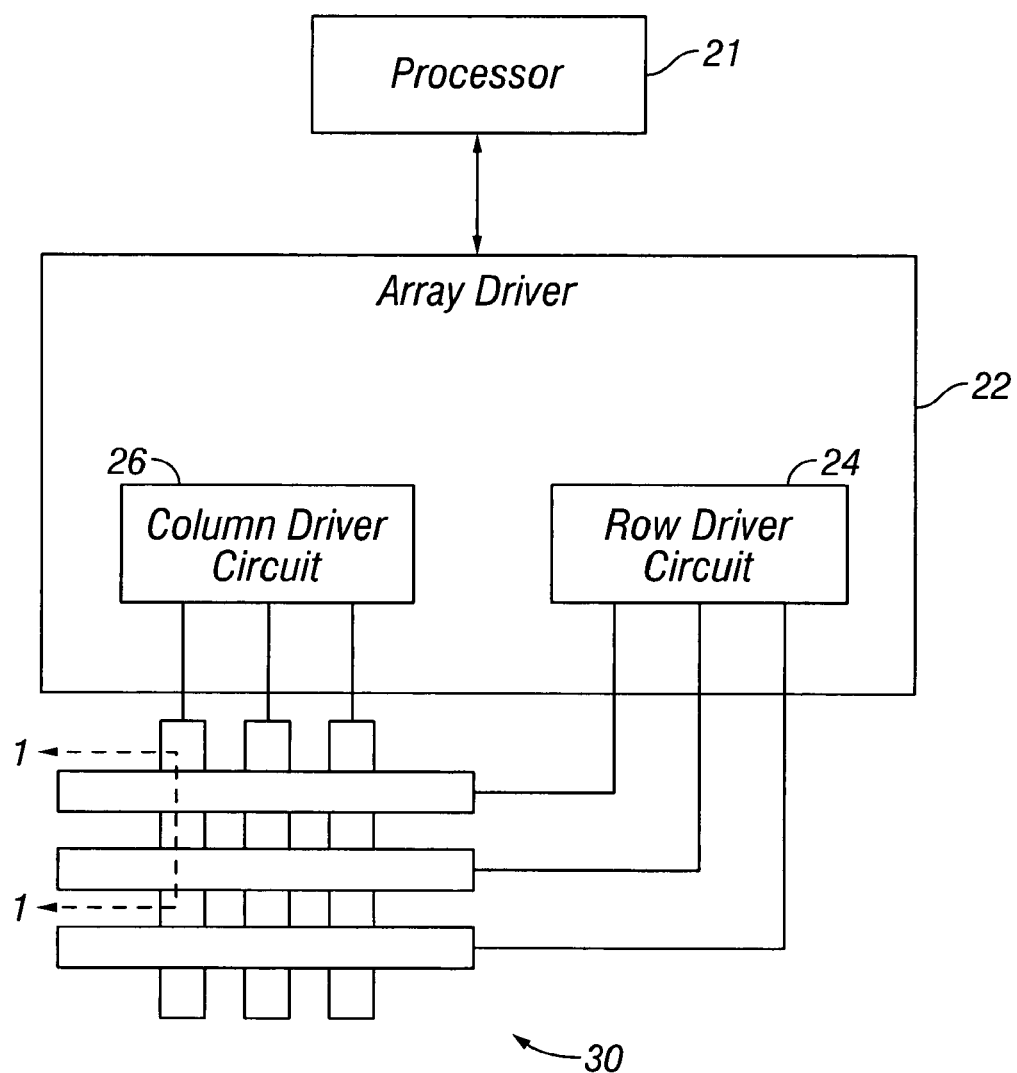
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
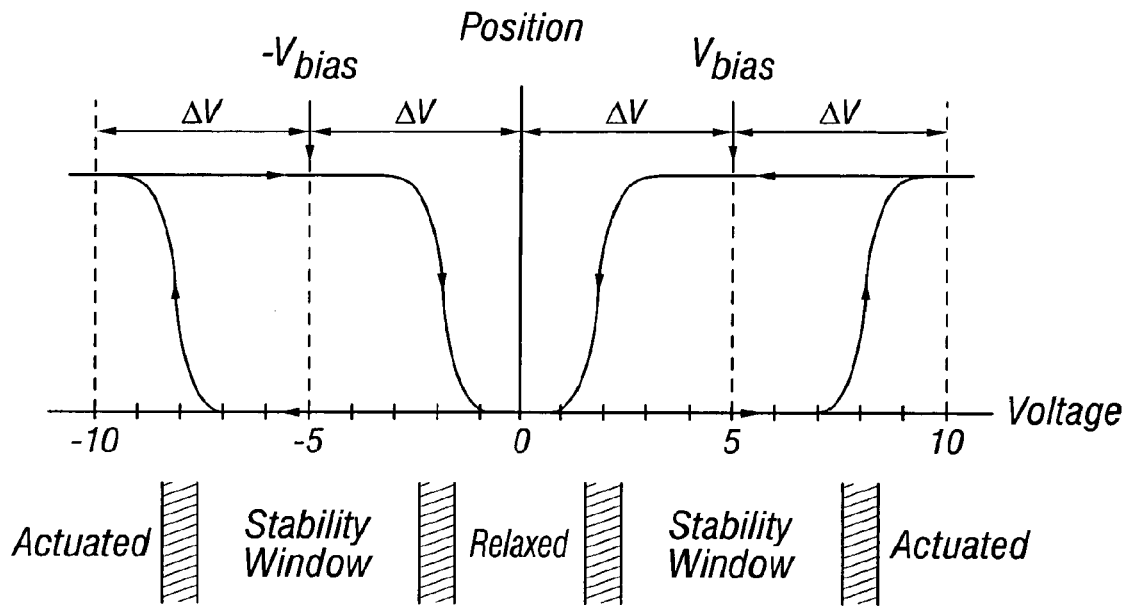
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
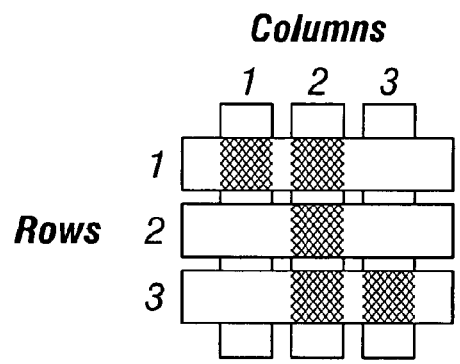
FIG. 5A illustrates one exemplary frame of display data in the 3×3 interferometric modulator display of FIG. 2.
Figure 5B:
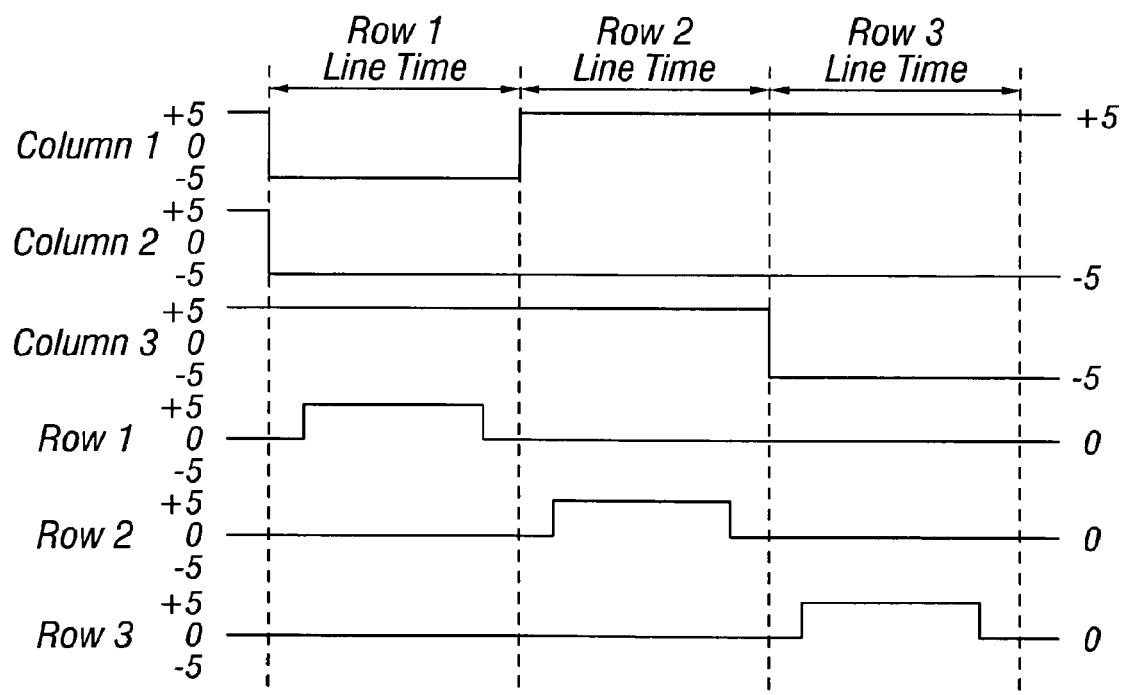
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
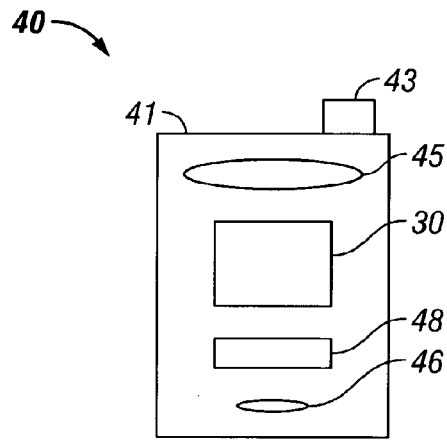
FIGS. 6A and 6B are system block diagrams illustrating an embodiment of a visual display device comprising a plurality of interferometric modulators.
Figure 6B:
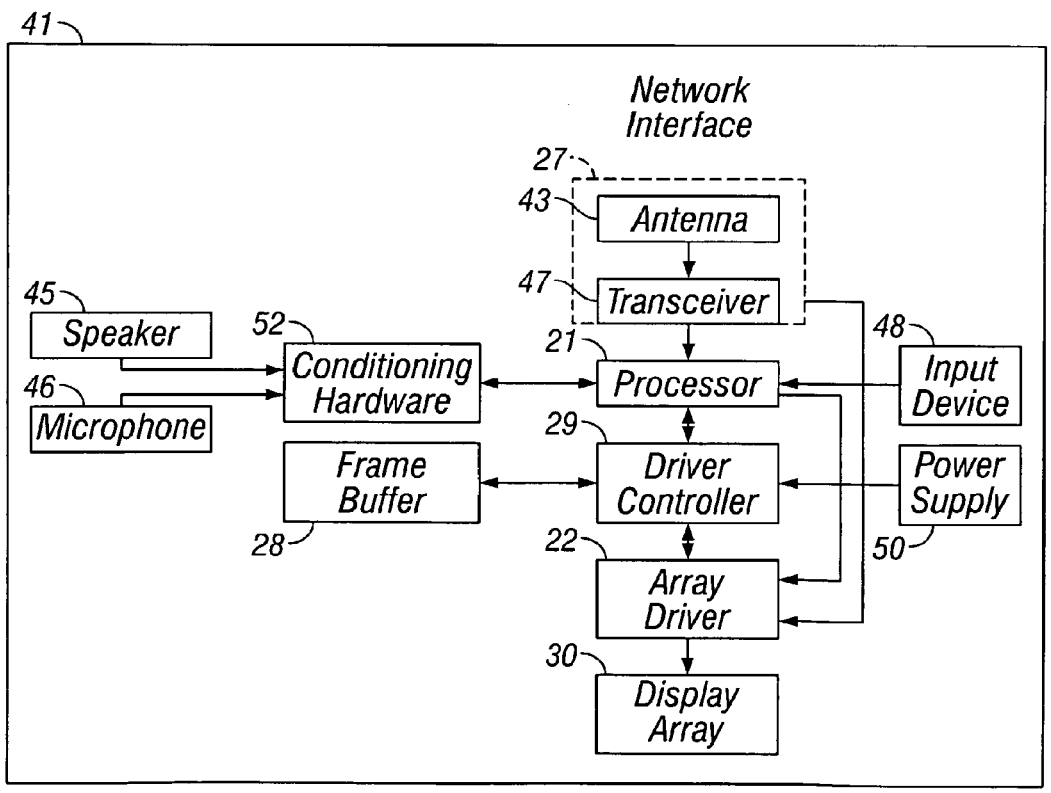

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players, or decorative panels. Such display devices may not include, for example, a speaker, a microphone, or conditioning hardware, and may be wirelessly controllable using certain of the other components discussed below.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46.

Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
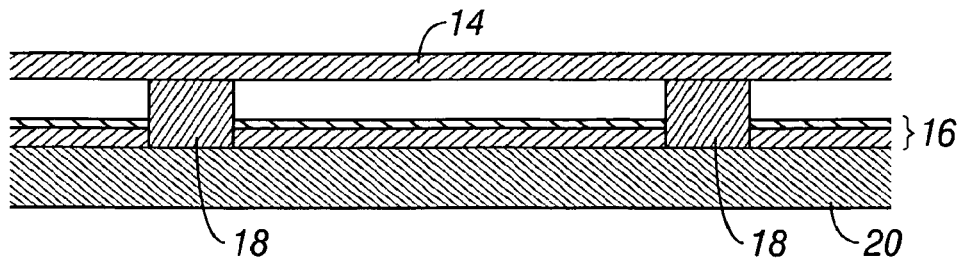
FIG. 7A is a cross section of the device of FIG. 1.
Figure 7B:
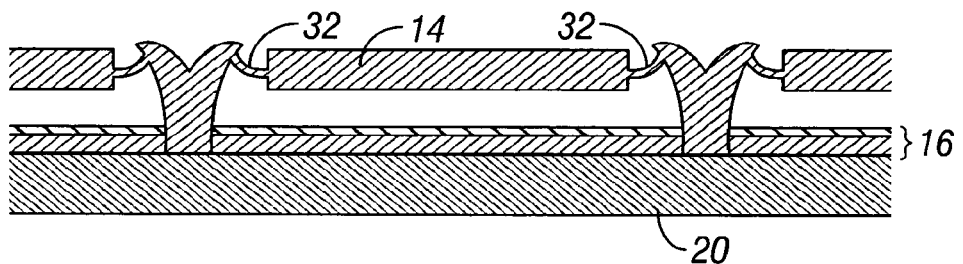
FIG. 7B is a cross section of an alternative embodiment of an interferometric modulator.
Figure 7C:
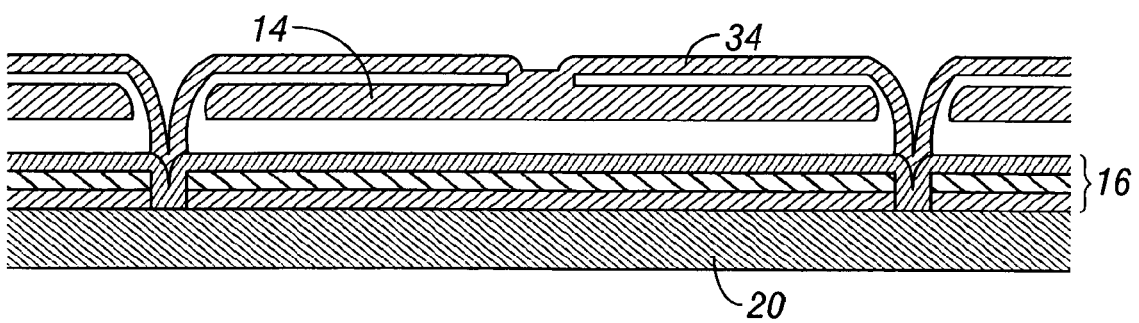
FIG. 7C is a cross section of another alternative embodiment of an interferometric modulator.
Figure 7D:
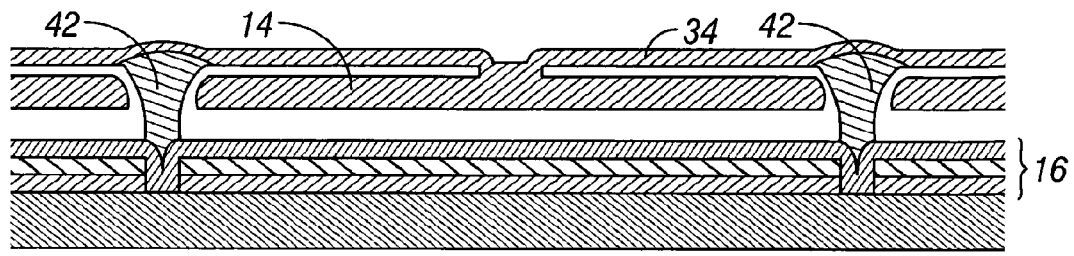
FIG. 7D is a cross section of yet another alternative embodiment of an interferometric modulator.
Figure 7E:
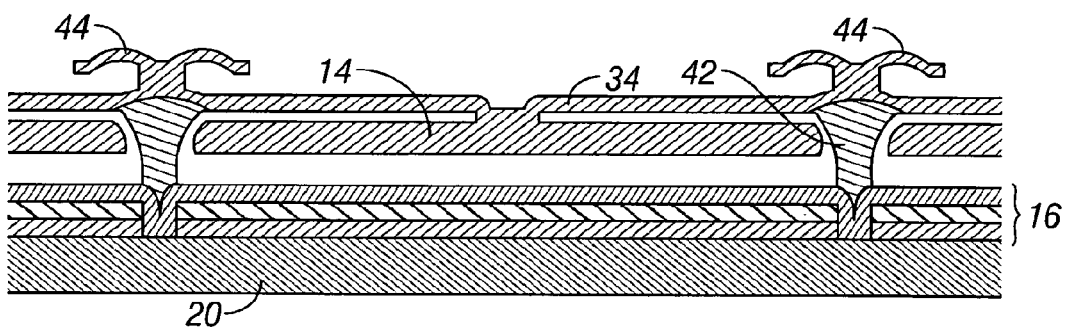
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

It will be understood that although the embodiments of interferometric modulators discussed above relate to interferometric modulators having a movable layer, other embodiments are possible. In particular, a static interferometric modulator may be provided, which includes a first partially reflective layer and a second layer which is at least partially reflective, separated by an interferometric gap defined by a light-transmissive material, such as a dielectric material. It will be understood that the second reflective layer may be partially reflective, or may be fully reflective, depending on the embodiment. For convenience, the first partially reflective layer will be referred to herein as a partially reflective layer, and the second reflective layer will be referred to as a reflective layer, and the two layers together may be referred to collectively as reflective layers, although it will be understood that the use of the term reflective layer is not intended to exclude partially reflective layers. Similarly, the partially reflective layer may be alternately referred to as an absorber.

In such a static interferometric modulator, there is no need to select or include conductive materials for use as electrodes, as the static interferometric modulator is not intended to be electrostatically actuatable. Similarly, the reflective layers need not be electrically isolated from one another, as there is no need to apply a voltage across the two layers. Thus, nonconductive material may be used to form the reflective layers, and conductive material may be used to define the interferometric gap. In alternate embodiments, a static interferometric modulator may comprise an air gap instead of a light-transmissive layer. In further embodiments, a static interferometric modulator may be identical to an actuatable interferometric modulator, and may simply not be actuated. It will be understood that the use of a solid material to define the air gap may provide additional stability, however, in addition to further possible advantages discussed below.

The wavelength reflected by a particular interferometric modulator is a function of the optical path length between the initial reflective layer upon which the light is incident and the second reflective layer. Thus, this optical path will vary as a function of the angle of incidence and angle of view, as the optical path will be increased when viewed at an angle to the normal, with the optical path length being larger as the angle to the normal increases. Thus, even for static interferometric modulators, the reflected wavelength can be altered by tilting the interferometric modulator relative to the observer to change the angle of view.

Figure 8:
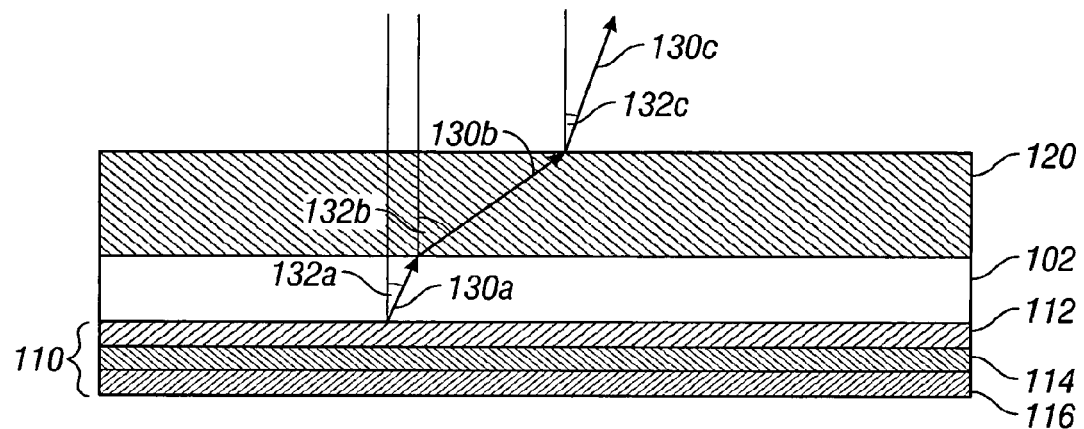
FIG. 8 is a cross section of an interferometric modulator stack comprising a textured laminate bonded to a substrate.

FIG. 8 illustrates an exemplary static interferometric modulator structure 100 comprising an interferometric stack 110 formed on a substrate 102 which is bonded to a laminate material 120. The interferometric stack 110 comprises a static interferometric modulator structure including an absorber 112, a reflector 116, and a spacer 114 which controls the size of the interferometric gap between the absorber 112 and the reflector 116.

In the illustrated embodiment, the interferometric modulator stack is configured to be viewed through the substrate 102. The substrate 102 thus desirably comprises a light-transmissive material, such as glass, polycarbonate, or polyethylene tetraphthalate (PET). In certain embodiments, the absorber 112 may comprise a material such as molybdenum, chromium, or titanium in an appropriate thickness to reflect a portion of incident light and transmit a portion of incident light therethrough, although it will be understood that other materials may be used. The spacer 114 may comprise a dielectric layer such as silicon oxide, zinc oxide, or aluminum oxide in a desired thickness, and may be of a thickness which is either partially or fully reflective, although other materials may also be used. The reflector 116 may comprise, for example, aluminum or gold, although other suitable reflective materials may also be used.

Although the illustrated embodiment is configured to be viewable from the substrate side, if the positions of the reflector 116 and absorber 112 were reversed, the stack 110 would be configured to be viewable from the opposite side. In such an embodiment, the reflector 116 and the substrate 102 may comprise a single reflective layer with sufficient mechanical strength.

In contrast to active interferometric modulators discussed above, in which the reflector may be electrostatically actuatable towards the absorber, or vice versa, a static interferometric modulator such as modulator stack 110 may not be electrostatically driven. Thus, a wider range of materials may be suitable for use in static interferometric modulators compared to active interferometric modulators. For example, the spacer layer 114 need not comprise a dielectric material, and the absorber 112 and reflector 116 need not comprise conductive materials. Both the reflective 116 layer and the absorber layer 112 can be selected without regard for their mechanical flexibility, as well.

Light reflected by the interferometric modulator stack 110 is shown by rays 130a, 130b, and 130c. The varying path taken by the light is due to the indices of refraction of the various layers through which it passes. Ray 130a is reflected from the interferometric modulator and travels at an angle 132a to the normal through substrate 102, which has an index of refraction of N1. Upon reaching the boundary between the substrate 102 and laminate 120, which has an index of refraction of N2, the light refracts and travels along ray 130b at an angle 132b. Similarly, upon reaching the boundary between the laminate 120 and the air or other medium in which the structure 100 is viewed, which has an index of refraction of N3, the light refracts again and travels along ray 130c to the viewer.

The amount of refraction when passing from one medium to the next can be determined by Snell's Law:

$$N_x \sin(\theta_x) = N_y \sin(\theta_y)$$

which describes the relationship between the indices of refraction $N_x$, $N_y$ of the two materials, and angles of incidence $\theta_x$ and refraction $\theta_x$, when light passes from medium x into medium y. The angles are measured from the normal at the point of incidence, wherein the normal is orthogonal to the boundary between the two media. Thus, light passes from a medium with a higher index of refraction into a lower index of refraction, the angle of refraction will be greater than the angle of incidence. If either the angle of incidence or the difference between the two indices of refraction is sufficiently high, the light will be totally internally reflected, and not pass into the medium with the lower index of refraction.

Figure 9A:
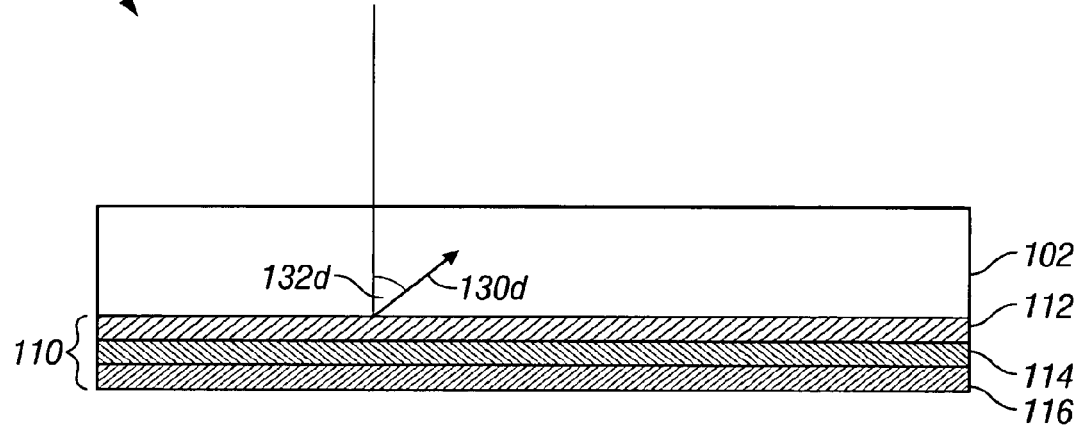
FIG. 9A is a cross section of an interferometric modulator stack deposited on a substrate.
Figure 9B:
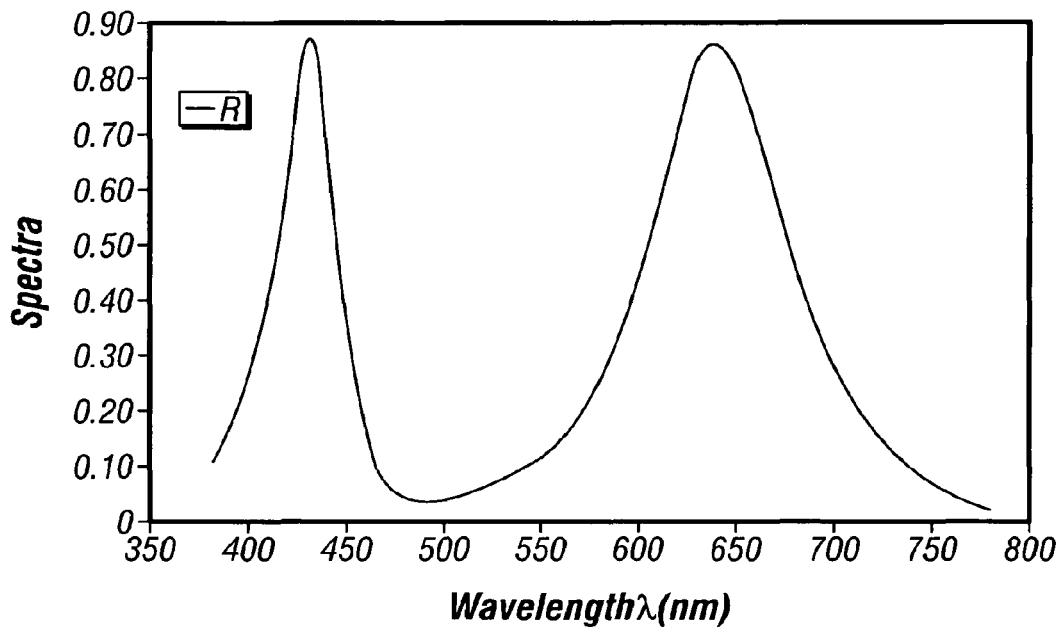
FIGS. 9B and 9C illustrate the spectral response of the structure of FIG. 9A at two different angles of view.

The angle at which an interferometric structure 100 is viewed will change the optical path of light reflected towards the viewer, increasing the optical path and thus the effective height of the interferometric cavity as the angle from normal increases. This change in optical path length will affect the peak reflected wavelength, changing the color of visible light which a viewer sees. The effective angle of view of the interferometric modulator will be altered by this refraction. Thus, the choice of the stack materials and thicknesses, the substrate material, and the laminate material and design can be used to alter the color perceived FIG. 9A illustrates an exemplary interferometric stack 110 formed on a substate 102. For simplicity, no laminate 120 is used in this embodiment. In this particular embodiment, the substrate 102 comprises PET having an index of refraction of 1.61, the absorber 112 comprises an 80 Å layer of Molybdenum, the spacer 114 comprises a 4200 Å layer of silicon oxide, and the reflector 116 comprises a 500 Å layer of aluminum. A ray 130d is viewed at an angle 132d from the interferometric modulator stack 110. When the interferometric modulator stack is viewed along the normal (132d=0°), the second order reflectivity peak is at about 640 nm (red light), and the third order reflectivity peak is at about 430 nm (blue light), yielding a perceived color of magenta. The spectral response is illustrated in FIG. 9B.

Figure 9C:
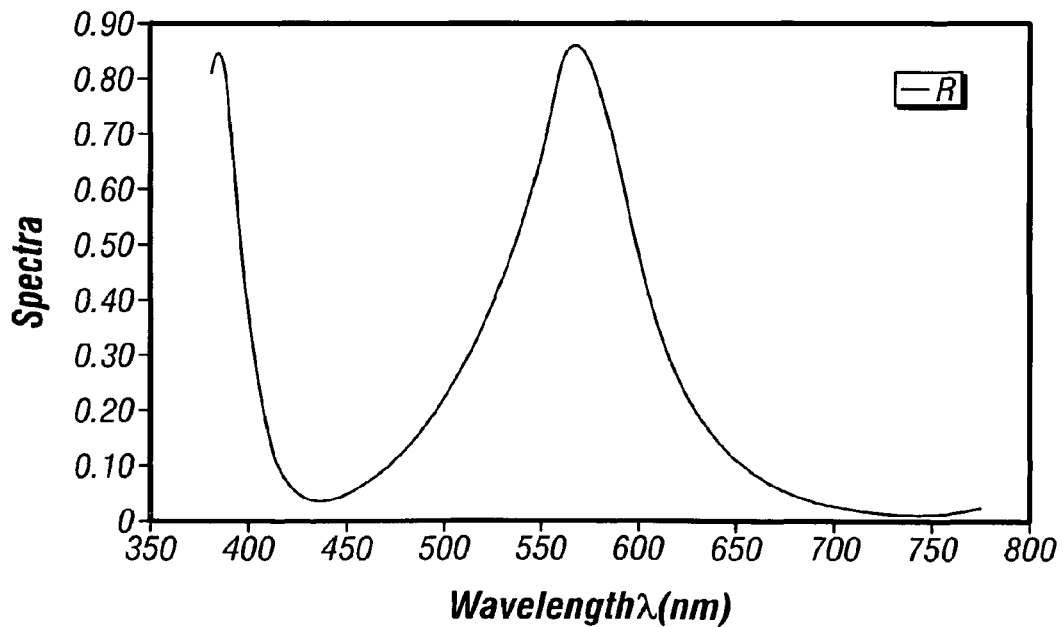
Figure 9D:
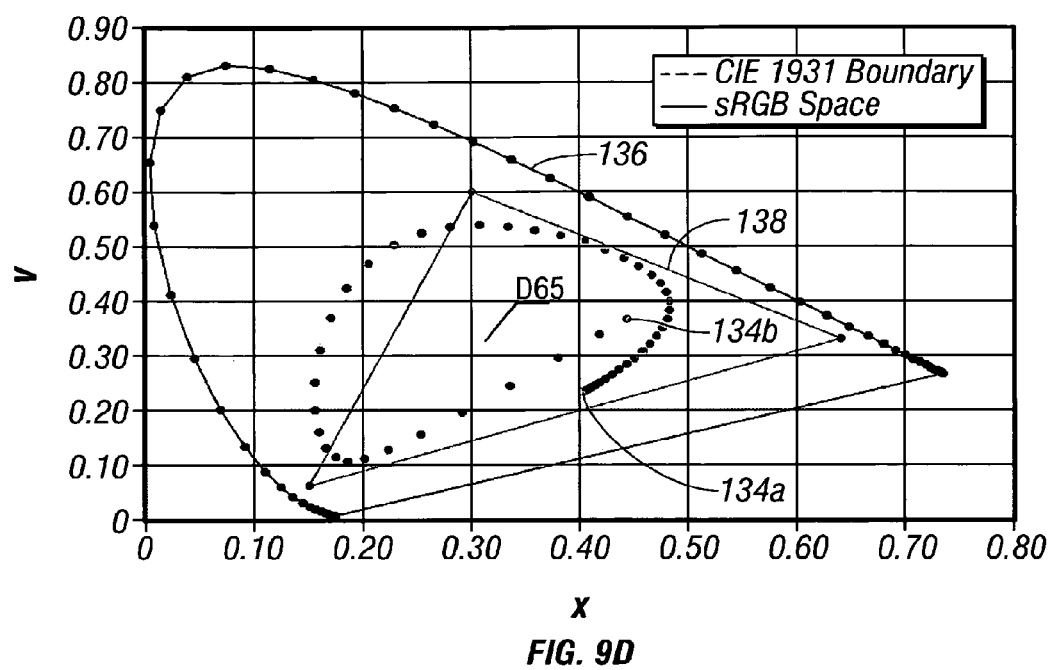
FIG. 9D is a chromaticity diagram illustrating the colors reflected by the structure of FIG. 9A when the angle of view is varied.

When the device of FIG. 9A is viewed from within the substrate at a non-zero angle, the reflectivity peaks will shift. As the angle 132d increases, the reflectivity peaks shift to shorter wavelengths. FIG. 9C illustrates the spectral response of the device of FIG. 9A when viewed at an angle of 25° to the normal (132d=25°). FIG. 9D is an illustration of the various colors seen by a viewer from within the substrate, shown on a CIE 1931 color space chromaticity diagram, when the angle 132*d* varies from 0° at point 134*a* to 50° at point 134*b*. The chromaticity diagram plots colors as a function of their chromaticity, independent of their brightness. FIG. 9D also illustrates the effective boundary 136 of visible light, as well as the boundary of the sRGB space.

As can be seen, as the view angle 132*d* increases, such as by tilting the device relative to the viewer, or by the view moving relative to the device, the perceived color seen by the viewer will vary significantly. Although it begins as a magenta color, and cycles back through a magenta color, the color as perceived by the viewer will move from magenta, and through colors such as green and blue.

By varying the thickness and composition of the materials in the interferometric stack, specific colors when viewed at specific view angles can be generated. In other embodiments, as will be discussed in greater detail below, the reflector may be at least partially transmissive, and the spectral response may vary as a function of angle of view when viewed from either side.

In addition, the application of a laminate 120 between the viewer and the interferometric stack 110 can be used to modify the range of color shift due to angle of view. In a particular embodiment, wherein the laminate is substantially flat, the laminate can be used to limit the range of angular color shift. In a structure such as the structure 100 of FIG. 8, where the substrate 102 and the laminate 120 comprise PET having an index of refraction of 1.61, if the structure 100 comprises is viewed at an angle of 45°, such that 132*c*=45°, then angles 132*a* and 132*b* will be roughly 26.1°. If the angle is increased to almost 90°, the maximum angle for a planar structure 100, angles 132*a* and 132*b* will only increase to roughly 38.4. This may significantly reduce both the rate of change of the spectral response as the angle of view varies, as well as limiting the potential range of colors perceived when the angle of view changes.

In other embodiments, the indices of refraction of the laminate 120 and the substrate 102 may be different. In such embodiments, the angles 132*a* and 132*b* will differ due to refraction at the boundary between the laminate 120 and the substrate 102. In one embodiment, the laminate may comprise PET having an index of refraction of 1.61, and the substrate may comprise glass having an index of refraction of 1.54. In such an embodiment, assuming the use of an index-matched adhesive having the same index of refraction as one of the two layers, when angle 132*c* is 45°, angle 132*b* is 26.1°, and angle 132*a* is 27.4°. Because the index of refraction of the laminate 120 is greater than that of the underlying substrate 102, the light refracts in the direction of the normal when passing from the substrate to the laminate, and refracts away from the normal when passing from the laminate to the external medium, such as air.

In certain embodiments, this color shift may be aesthetically desirable, and the color-shifting properties of the interferometric modulator may be utilized in various ways. In particular, in certain embodiments, an assembly may be provided in which a textured surface, such as a laminate having a non-planar surface, is positioned between the observer and the interferometric modulator, so as to alter the path of at least a portion of the light reflected from the interferometric modulator. In particular, it will be understood that light which would ordinarily be reflected in a direction away from the viewer may now be reflected towards the viewer due to the shape of the textured surface, as will be described in greater detail below. The viewer may thus observe a range of colors in a pattern related to the shape of the textured surface.

Figure 10A:
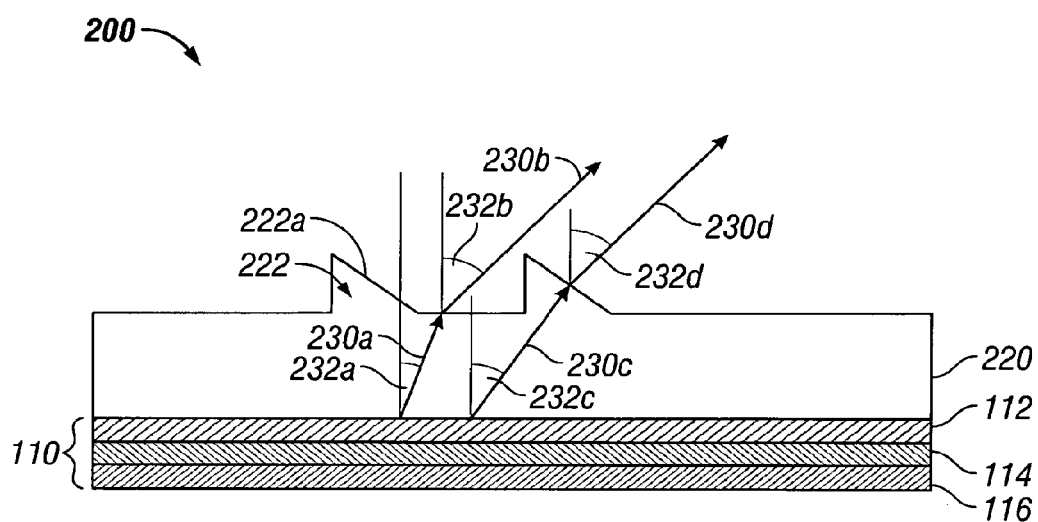
FIG. 10A is a cross section of an interferometric modulator stack having a textured laminate bonded thereto, where the textured laminate includes a prism structure.

In certain embodiments, a laminate 220 may comprise a surface which is oriented at a non-zero angle to an interferometric modulator. FIG. 10A illustrates an embodiment of an interferometric structure 200 comprising such surfaces. The structure 200 comprises an interferometric modulator stack 110 bonded to the laminate 220 which comprises optical features in the form of prismatic strips 222 having a surface 222*a* oriented at a non-zero angle to the interferometric modulator stack 110. For simplicity, the illustrated embodiment does not include a substrate but it will be understood that in other embodiments a substrate such as substrate 102 (see FIG. 8) may be disposed between the laminate 120*b* and the interferometric stack 110.

A first ray 230*a* of light leaves the interferometric modulator stack 110 at an angle 232*a* to the stack 110, and passes through the laminate toward the viewer at a planar portion of the laminate 220, where the light is refracted and travels toward a viewer along ray 230*b* at an angle 232*b* to the normal. A second ray of light 230*c* leaves the interferometric modulator stack 110 at an angle 232*c* to the stack 110, and passes out of the laminate 220 toward the viewer through angled surface 222*a* of prismatic strip 222, where the light is refracted and travels toward a viewer along ray 230*d* at an angle 232*d* to the normal. It can be seen that although the two rays of light 230*c* and 230*d* which reach the viewer travel along parallel paths, the initial paths of the two light rays, shown by rays 230*a* and 230*b* are not parallel.

Figure 10B:
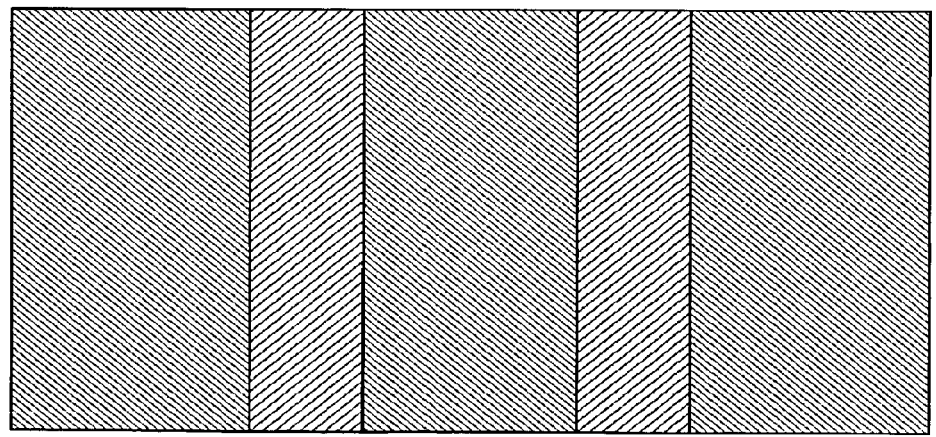
FIG. 10B is an overhead view of the structure of FIG. 10.

Thus, when the structure 200 is viewed at the position and angle shown in FIG. 8, the ray 230*b* of light will be perceived by the viewer as the color which would be seen if an unlaminated interferometric stack 110 was viewed at an angle 232*a* to the normal, and the ray 230*d* of light will be perceived as color which would be seen if the stack 110 was viewed at an angle 232*c* to the normal. FIG. 10B illustrates the pattern which would be seen by a viewer, wherein the prismatic strips 222 appear as a first color, and the portions of the laminate 220 between prismatic strips 222 appear as a second color.

In a particular embodiment, the stack 110 may comprise the stack previously discussed with respect to FIG. 9A, wherein the absorber 112 comprises 80 Å of molybdenum, spacer 114 comprises 4200 Å of silicon oxide, and reflector 116 comprises 500 Å of aluminum. The laminate 220 comprises a PET layer having an index of refraction of 1.61, and a substrate 102 (not shown) also comprising PET may be disposed between the laminate 220 and the stack 110. The upper surface of laminate 220 comprises prismatic strips 10 mm wide and spaced 10 mm apart, wherein the angled surfaces 222*a* are oriented at a 30° angle to the planar portions of the laminate 220. When the structure 200 is viewed at an angle of 45° (i.e., angles 232*b* and 232*d* are 45°), angle 232*a* will be 26.1°, and angle 232*c* will be 39.3°. Thus, the strips 222 will appear blue with a peak wavelength of approximately 470 nm, and the spaces between the strips 222 will appear green with a peak of roughly 560 nm.

Because this particular stack has the spectral response shown in FIG. 9D, the colors seen by the viewer at any given position are given by points along the color path representing the range of colors seen when the angle of view of the stack is varied. In this particular embodiment and orientation, the color of the strips 222 is given by the color at point 134*c* on the chromaticity diagram, and the color of the laminate in the areas between the strips is given by the color at point 134*c*. As the angle of view of the structure 200 is varied, the colors of the strips and the spaces between will vary along the color path shown in FIG. 9D.

In certain embodiments, the features such as prismatic strips 222 may be distinguishable by a viewer standing at a desired distance, such that a specific pattern may be observed. In other embodiments, some or all of the features may be of a size or density such that the individual features are not individually distinguishable. In such an embodiment, those areas may cause a color mixing or diffusive effect, such as those used in color displays to display a particular color by utilizing multiple component pixels, such as those of primary colors.

In these embodiments, the light reflected towards a viewer may have a wavelength composition which could not be generated by a interferometric modulator stack standing alone. For example, if the features discussed above were formed on a much smaller scale, or if the viewer were positioned sufficiently far from the structure, the resultant light would be a combination of the blue and green wavelengths coming from the various portions of the structure. In particular, the light would have peaks at both 470 nm and 560 nm. Light having such a wavelength composition could not be formed using only the particular stack discussed above, but the inclusion of optical features on or within the laminate makes such wavelength combinations possible.

Figure 11:
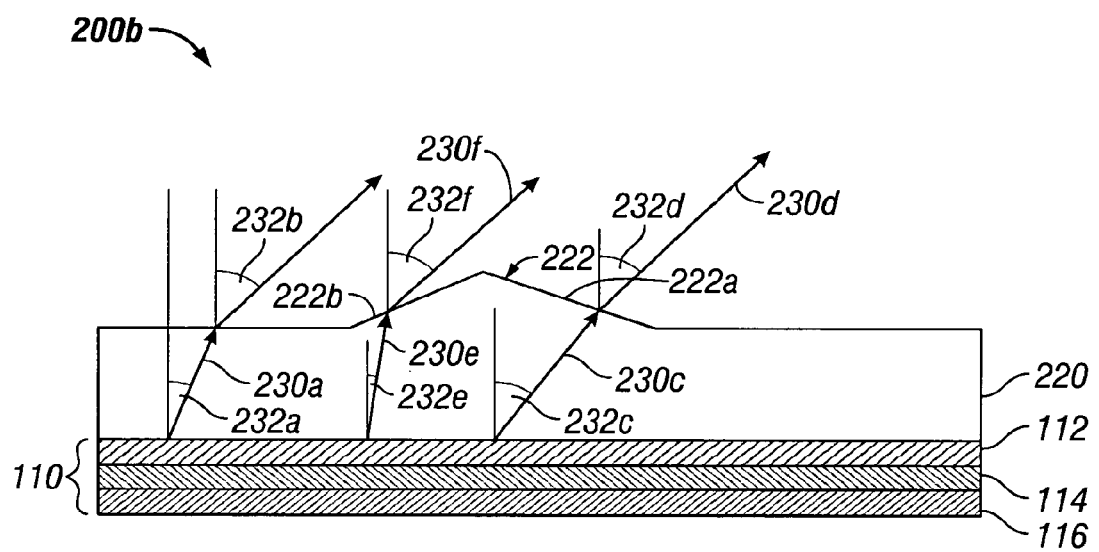
FIG. 11 is a cross section of an alternate embodiment of an interferometric modulator stack having a laminate including a prism structure bonded thereto.

FIG. 11 illustrates another embodiment of a structure 200b comprising optical features in the form of prismatic strips 222. In contrast to the embodiment of FIG. 10A, in which one of the surfaces of the prismatic strip 222 was substantially perpendicular to the interferometric stack 110, the embodiment of FIG. 11 comprises a prismatic strip having another planar surface 222b oriented at a comparatively shallow angle to the interferometric stack 110. A ray of light 230e which leaves the stack 110 at an angle 232e is refracted at surface 222b and leaves the laminate 220 along ray 230f at an angle 232f to the normal. Because of the relatively shallow angles at which the surfaces 222a and 222b are oriented relative to the substrate, both can be seen over a wide range of angles, yielding a mixture of three colors when viewed from a wide range of angles.

Figure 12A:
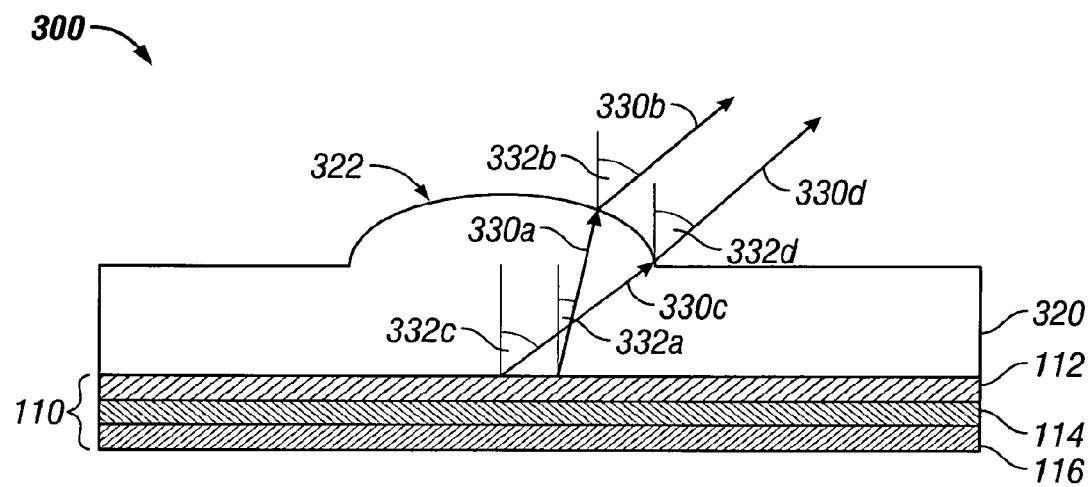
FIG. 12A is a cross section of an interferometric modulator stack having a laminate including a spherical lens structure bonded thereto.

In other embodiments, optical features may be used which comprise curved or otherwise continuously varying surfaces. FIG. 12A illustrates a structure 300 which includes an interferometric modulator stack 110 and a laminate 320 comprising optical features in the form of curved surfaces such as spherical lens structure 322. It can be seen that ray 330a leaves the interferometric stack 110 at an angle 332a and refracts at the edge of spherical lens structure 322, traveling along ray 330b at an angle 332b to the normal towards a viewer. Ray 330c, which leaves stack 110 at an angle 332c which is different from angle 332, passes through a different portion of spherical lens structure 322 and refracts to travel along ray 330d at an angle 332d toward the viewer, where angle 332d is substantially parallel to angle 332b.

Figure 12B:
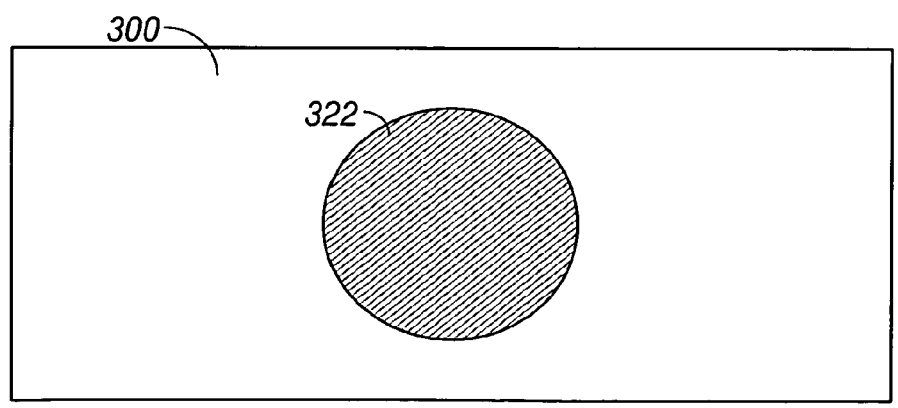
FIG. 12B is an overhead view of the structure of FIG. 12A.

In contrast to the prismatic structures which comprise angled planar surfaces which can appear as discrete areas of substantially contant color, curved or continuously variable surfaces will appear as a gradient of colors. FIG. 12B illustrates an overhead view of a structure 300 comprising a positive spherical lens structure 322. In such an embodiment, when viewed at an angle, the portions of the positive spherical lens structure 322 adjacent the viewer will demonstrate more angular color shift than those on the side of the lens structure 322 away from the viewer.

Figure 12C:
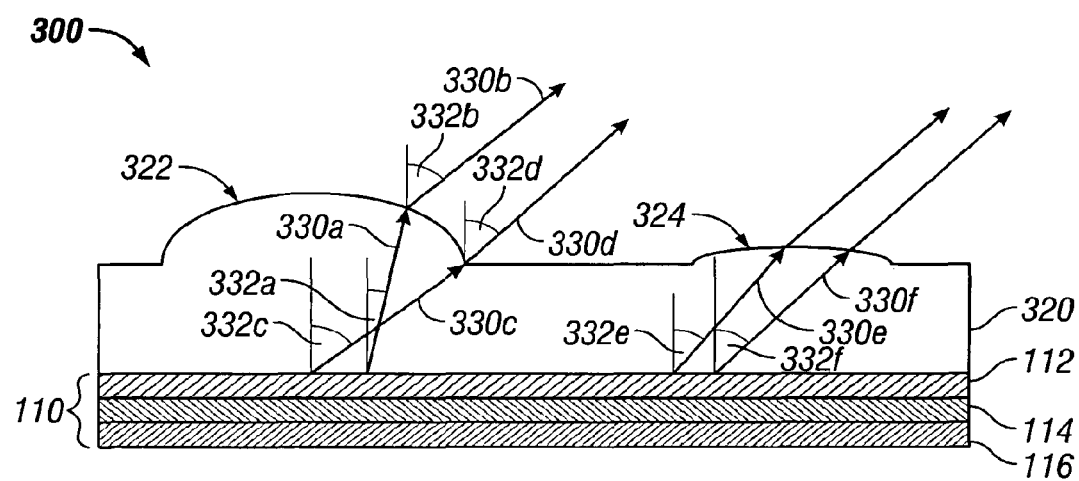
FIG. 12C is a cross section of an alternate embodiment of an interferometric modulator stack having a laminate including two spherical lenses bonded thereto.

The height of the lens structure (or depth, in the case of negative lens structures which may take the form of rounded depressions in the laminate) also affects the degree of color shift. FIG. 12C illustrates another embodiment of a structure 300b comprising spherical lens features 322 and 324, wherein lens 324 is shallower than lens 322. It can be seen that the difference between the angle 332e at which ray 330e leaves the stack 100 and the angle 332f at which ray 320f leaves the stack 110 is less than the difference between angles 332a and 332c, and that the angular color shift over the shallow lens structure 324 will be less than that exhibited by lens 322.

In other embodiments, faceted features may be used in place of prismatic or curved structures, and any combination of such features may be used. For example, a single optical feature may comprise both planar surfaces and curved surfaces. Prismatic structures can be oriented with different angles relative to one another so that different surfaces are in view at different locations and angles of view. Optical features of any type may be discrete, lenticular, arranged in patterns or in a predefined shape or image, or arranged randomly for aesthetic effect.

Such an assembly may be used in a wide variety of applications. In certain applications, the assemblies may be used in the architecture, design, and construction fields, and may be integrated into building materials or utilized as design elements. For example, tiles comprising such assemblies may be utilized in construction. A wall panel comprising such an assembly may be utilized in construction or design, as well. Such an assembly may be integrated into many design elements, such as in the background of a frame. An interferometric modulator in a desired shape may be utilized in such an assembly to provide an aesthetically pleasing and eye-catching logo. A wide variety of other uses are contemplated and possible.

FIGS. 13A through 13D illustrate in cross-section potential structures including a layer of textured glass positioned adjacent a substrate supporting an interferometric modulator array. It can be seen in FIG. 13A that assembly 400a comprises a modulator substrate 102 which supports an interferometric modular array or stack 410. A textured layer 420a, such as the laminates discussed above, is secured to the opposite side of substrate 102 from the interferometric modulator array 410 via adhesive 408. Although shown as having a random texture, it will be understood that regular patterns using the optical features discussed herein may be used as well. In certain embodiments, the textured layer may have a substantially random pattern, such that any pattern which may exist in the texture is not immediately recognizable by an observer.

Figure 13A:
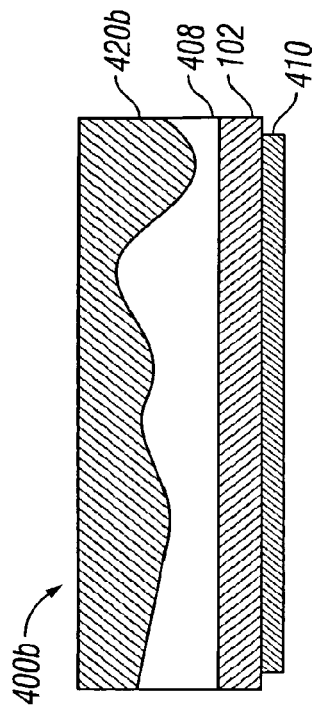
FIGS. 13A-13D are cross sections of alternative embodiments of assemblies comprising interferometric modulator arrays and textured layers.
Figure 13B:
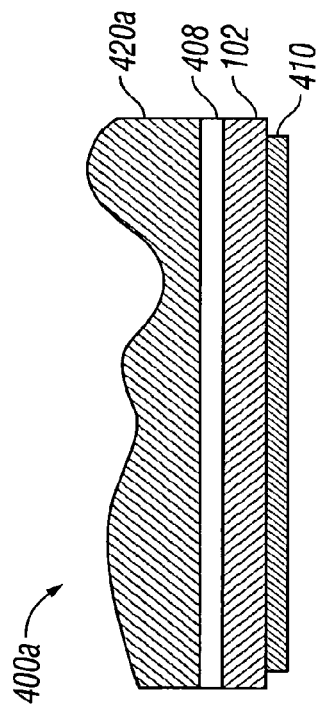
Figure 13C:
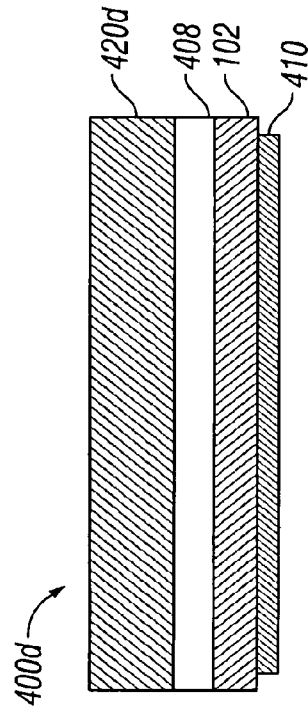
Figure 13D:
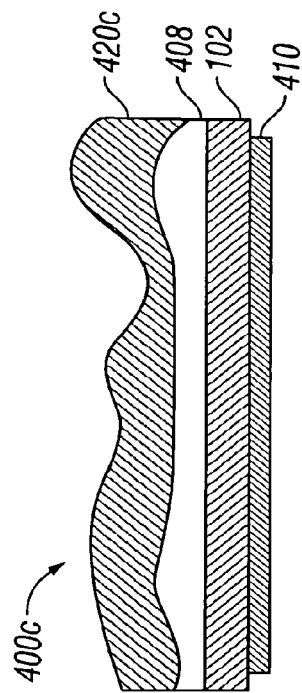

In the embodiment illustrated in FIG. 13A, textured layer 420a is textured on only a single side, which in the illustrated embodiment is the side located away from the interferometric modulator array, although in other embodiments the textured layer 420a may be reversed, such that the variance in refraction which alters the effective optical path of light reflected by the interferometric modulator array 410. In FIG. 13B, it can be seen that assembly 400b differs from assembly 400a of FIG. 13A in that the textured side of layer 420b is textured on the side facing the modulator substrate 102. In FIG. 13C, it can be seen that the textured layer 420c is textured on both sides. In FIG. 13D, the texture of layer 420d may be a micro texture which appears roughly flat, and in alternate embodiments may comprise texture within the layer, such as through the inclusion of air or other bubbles within the layer 420d.

The effect of such textured layers, whether substantially random or comprising a regular pattern, may be to provide a pattern of colors reflected by the assembly. In certain embodiments, in contrast to corrective layers designed to provide a uniform color or to minimize color shift as a function of angle of view, these color patterns may be readily distinguishable by an observer, so as to provide a pleasing optical effect. As noted above, these color patterns may comprise distinct sections of color, in the case of prismatic features, or may comprise color gradients in the case of curved features or substantially random textures.

Textured layers 420a and other textured layers may comprise any of a variety of materials, including but not limited to glass and polymers. In addition to the optical features discussed elsewhere in the application, such layers may also comprise sublayers or striation, and may in certain embodiments, be liquid or semi-liquid, and may be held in place by additional layers. Layers 420a and other textured layers may in certain embodiments not cover the entire interferometric modulator array, or an entire interferometric modulator, so as to make use of the aesthetics from the edges of the textured material.

In certain embodiments, only a textured adhesive layer may be provided, instead of a separate textured layer and adhesive. A light-transmissive adhesive layer may thus be provided and embossed, and then cured to form the desired shape. In other embodiments, the adhesive layer may not extend over the entire area between the substrate 102 and the textured layers 420a and 420b, and there may be an air gap located between portions of the textured layer and the substrate. In particular embodiments, particularly when the textured layer comprises a textured layer adjacent the substrate (as shown in FIG. 13B), the adhesive may be placed only where the textured layer contacts or comes close to the substrate. In other embodiments, mechanical components may be used to secure the textured surface relative to the modulator substrate, such as a clip or other fastener, or the two may be independently held in place relative to one another.

In certain embodiments, as will be discussed in greater detail below, certain of the layers within the structure, such as one or both of the adhesive and the reflective surface, may be stained or colored so as to further affect the wavelength of light shining through them. The color shifting characteristics of the assembly may thus be enhanced or changed in an additive way, as the color seen by an observer is affected by the color of the textured layer and adhesive, in addition to that of the interferometric modulator array. As an example, a magenta interferometric modulator used in conjunction with green textured glass will produce white in portions of the resultant pattern.

In certain embodiments, the texture of the textured layer may be essentially random, such as "rain glass" or architectural glass having included air bubbles. In other embodiments, as noted above, the texture may have a specific pattern or particular optical properties, such as fluted glass. In particular embodiments, the texture may comprise, for example, a lens design such as a lens structure of the type discussed above. In certain embodiments, this lens design may be a traditional lens or a Fresnel lens to allow a flatter textured layer to be used. As described above, the lens may be designed to create specific color shift at certain angles, or to control the range of color shift. The lens may be designed to create an image or pattern at particular viewing angles. In other embodiments, a prismatic or holographic structure may be used as or in addition to the textured layer.

As noted above, in certain embodiments the adhesive may be index matched to an adjacent layer so as to minimize refraction at the boundary between the adhesive layer and the index-matched adjacent layer. However, in other embodiments the adhesive layer may comprise an index of refraction which differs from that of the adjacent layers, causing refraction at each boundary. In certain embodiments, the adhesive is selected to have a refractive index less than that of the modulator substrate, so as to prevent or minimize total internal reflection of light directed towards the interferometric modulator array. However, by varying the refractive index of the adhesive layer, and the resultant total internal reflection angle, the color shifting characteristics of the assembly may be varied in a desired manner. By controlling the total internal reflection angle, the maximum optical path of light reflected by the interferometric modulator can be controlled, thereby controlling the color shift.

In certain embodiments, an interferometric modulator array may be disposed upon the back surface of a textured layer. However, it will be understood that by providing a modulator substrate distinct from the textured surface, greater flexibility is available in terms of materials usable for the textured surface. In particular, the textured surface may, in the case of a glass layer, be tempered at temperatures which would harm or destroy the interferometric modulator, so as to provide additional structural strength. In certain embodiments, the textured layer may be the primary structural support for the assembly. Any suitable off-the-shelf textured glass can thus be used in fabricating the assembly. Furthermore, it may be difficult to coat a textured surface in order to form an interferometric modulator array, in the case of a layer textured on both sides. In certain embodiments, the textured layer may comprise a glass layer which is about 2.3 mm in thickness or larger, although it will be understood that the size of the layer may vary significantly depending on the composition and intended use of the assembly. For example, in an embodiment in which the textured layer comprises a laminate bonded to a substrate, one of the textured layer or the substrate can comprise a comparatively thick layer which provides mechanical strength, allowing a thinner layer to be used as the other layer.

Although described as an array, it will be understood that any number of interferometric modulator elements may be provided on the substrate, including as few as a single interferometric modulator extending over part or all of the substrate. In addition, although the interferometric modulator array 104 is pictured as being on the opposite side of the substrate 102 from the textured surface and adhesive, it will be understood that a static interferometric modulator array 104 may be provided on the same side of the substrate as the textured surface. The rigidity of a static interferometric modulator structure may permit the textured layer to be adhered directly to the interferometric modulator array. In such an embodiment, it may be desirable to reverse the positions of the partially reflective layer and the reflective layer, such that the partially reflective layer is positioned between the reflective layer and the textured surface. Furthermore, as noted above, in such an embodiment the modulator substrate need not be reflective to light, and may comprise any suitable transmissive or opaque material.

In certain embodiments, a single interferometric modulator structure may be provided, which may extend over part or all of the substrate. On other embodiments, a tiled structure of static interferometric modulators having different optical gaps may be provided, and the textured glass may serve to blend the various colors together and blur the edges of the tiles. In an alternate embodiment, a single interferometric modulator structure having a varying optical gap may be provided, such as through the deposition of a dielectric spacer layer having a varying thickness. The range of variance in the thickness of such a variable-thickness interferometric modulator may be controlled so as to provide desired colors. In other embodiments, the differing interferometric modulators may have the same optical gap but may vary in materials selection, to provide different color characteristics (apparent color at normal angle and at off-normal angles) between the different interferometric modulators.

However, although the embodiments discussed herein are primarily discussed with respect to static interferometric modulator structures, it will be understood that they may be used with active interferometric modulator structures such as the interferometric modulator 16 of FIG. 1. In certain aspects, however, these embodiments may differ from devices such as interferometric modulator displays.

For example, if the device is being used as architectural glass or a similar decorative component, the device need not have the same resolution as a display. In certain embodiments, the pixels may be made very large, and in certain embodiments, multiple or even all pixels may be simultaneously driven. In a particular embodiment, an entire array may be simultaneously driven between a first state and a second state. Refresh rates may also be significantly slower in decorative applications than in displays, allowing the use of less complex driver circuitry, as well as the use of materials which may slow actuation of the interferometric modulators to a degree which might be unacceptable in a display.

Even in an embodiment in which it is not desirable for a viewer to be able to distinguish the components of a pattern, the components or pixels may be made significantly larger than in a display. This may be done both because the viewer may stand significantly farther away from embodiments such as architectural glass than they would a display, and because the textured glass may obscure the boundaries between pixels or areas of uniform color. Twenty-twenty vision is defined as the ability to resolve a spatial pattern separated by an angle of one minute of arc. At a distance of 5 m, a viewer having 20-20 vision is able to see a feature separation of 1.5 mm or roughly 17 pixels per inch, but at a distance of 50 cm the viewable separation is roughly 0.15 mm or 175 pixels per inch.

In addition, because larger portions of the array can be addressed simultaneously, the complexity of the driver, bussing, and addressing systems may be reduced. Masking of layers may be less necessary, as well, as unmasked components such as bussing layers or support structures may be less noticeable in large-scale embodiments. Although interferometric modulators which switch between a color state and a dark state may be used in such embodiments, bichrome interferometric modulators which switch between two different colors may be more desirable in certain applications.

It will be understood that the thickness of the interferometric gap can be modified to define the potential range of colors reflected within the pattern viewable by an observer, as the range of possible colors is dependent upon the air gap. Thus, particular dimensions can be used to define particular desirable color ranges viewable within the pattern. In particular embodiments in which a wide range of colors are desirable, the thickness of the interferometric gap may be selected so as to provide first-order red or second or higher order colors. Second-order colors will generally provide a wider range of color shift across the device, and more saturated colors, which in certain embodiments may be desirable.

Figure 14A:
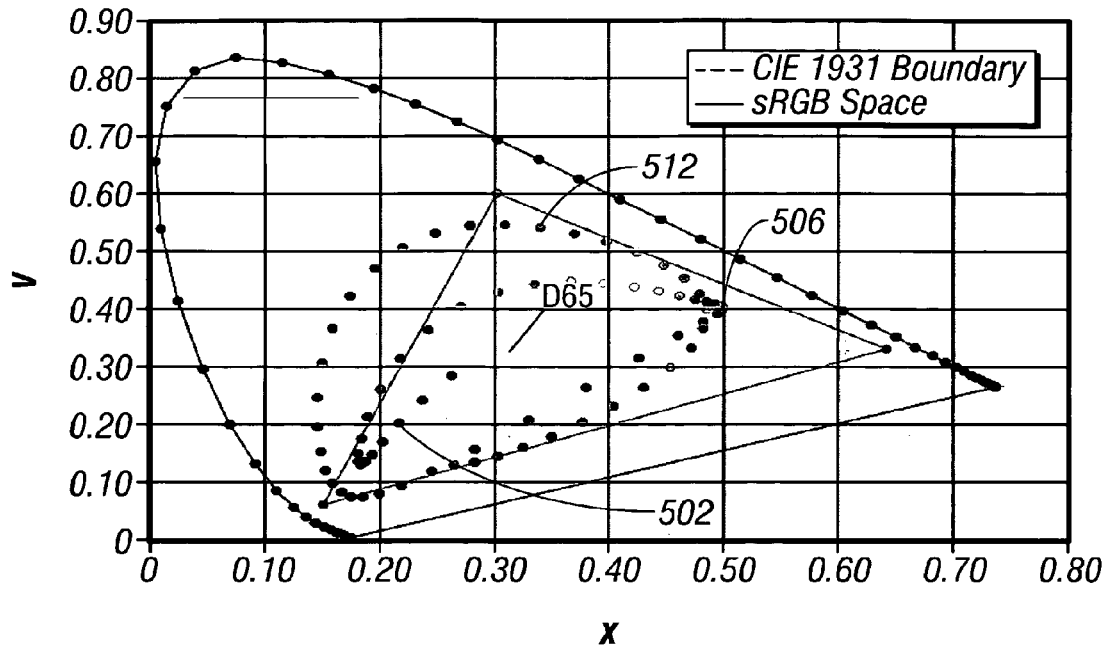
FIG. 14A is a chromaticity diagram illustrating changes in first order and second order colors for a structure similar to that of FIG. 9A as the height of the spacer is varied.

FIG. 14A illustrates a chromaticity diagram 500 showing changes in both on-axis first order colors 502 and second order colors 504 of the stack of FIG. 9B as a function of variance in the spacer layer from 900 Å to 4500 Å. The on-axis color shift resulting from a change in the thickness of the spacer layer is equivalent to the change in color resulting from an increase in the optical path due to a change in the angle of view for certain spacer thicknesses. It can be seen that the second order colors 504 on the outside of the chromicity diagram exhibit greater saturation than the first order colors 502 near the interior of the diagram. It can also be seen that areas of rapid or noticeable color transitions over a short change in path length may provide more visually acute color shifts as a function of angle of view, and may provide a wider range of colors which can be observed by a viewer. For example, if the spacer thickness is selected such that the resultant second color order is given by color 506, an increase in the spacer layer, which is equivalent to increasing the angle of view, will yield rapid and distinct color changes, providing a visually striking effect.

Figure 14B:
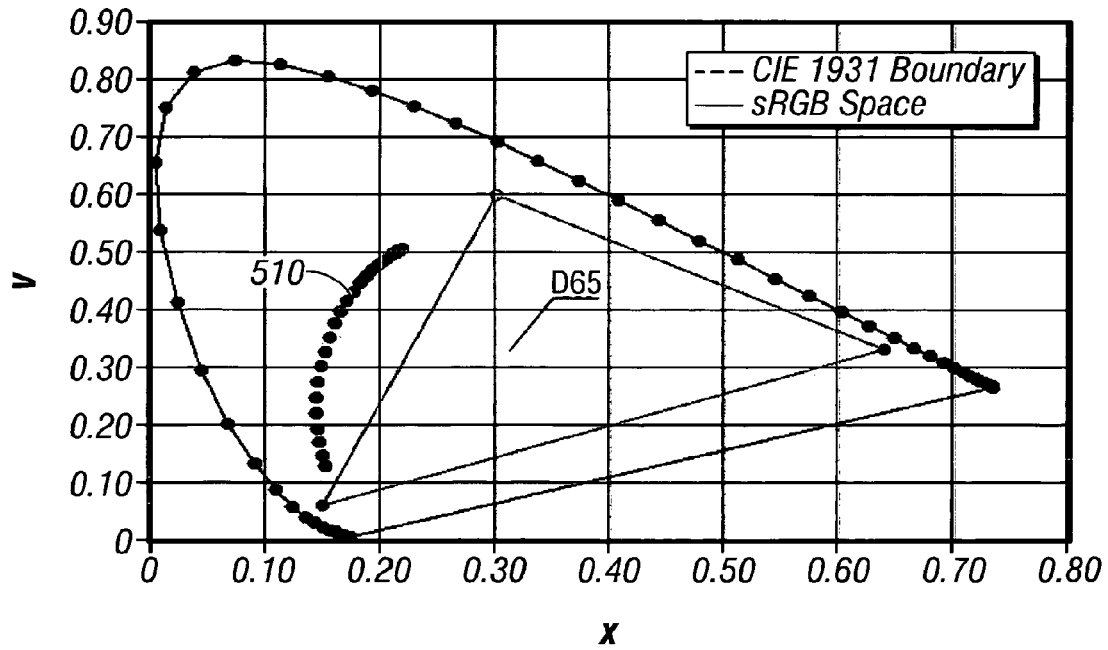
FIG. 14B is a chromaticity diagram illustrating changes in color for a second order color as a function of angle of view.
Figure 14C:
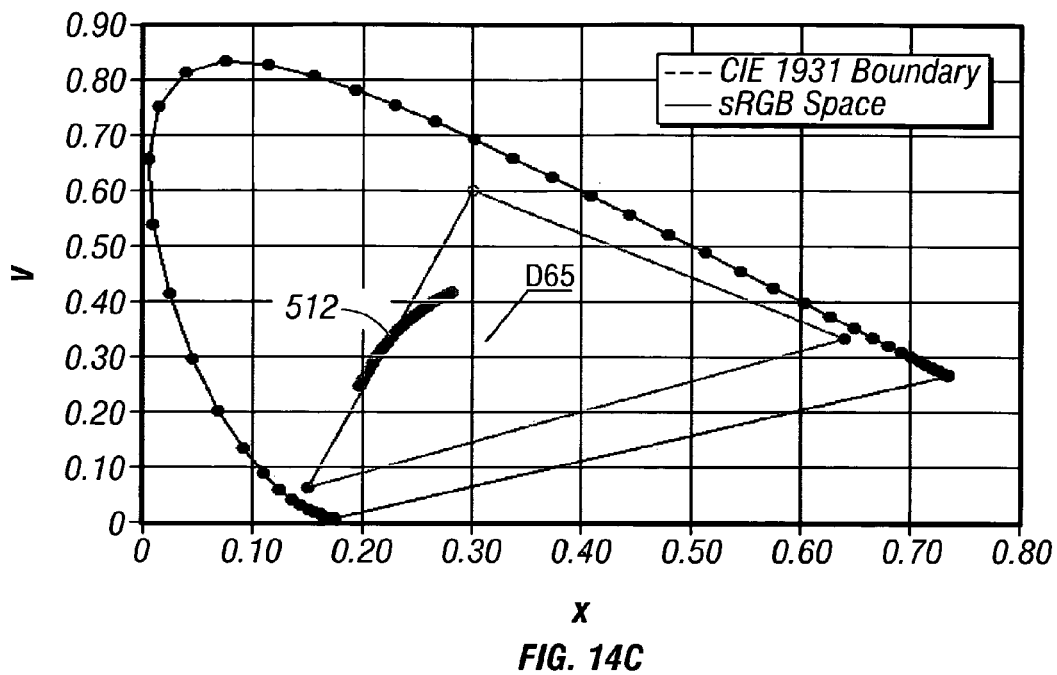
FIG. 14C is a chromaticity diagram illustrating changes in color for a first order color as a function of angle of view.
Figure 14D:
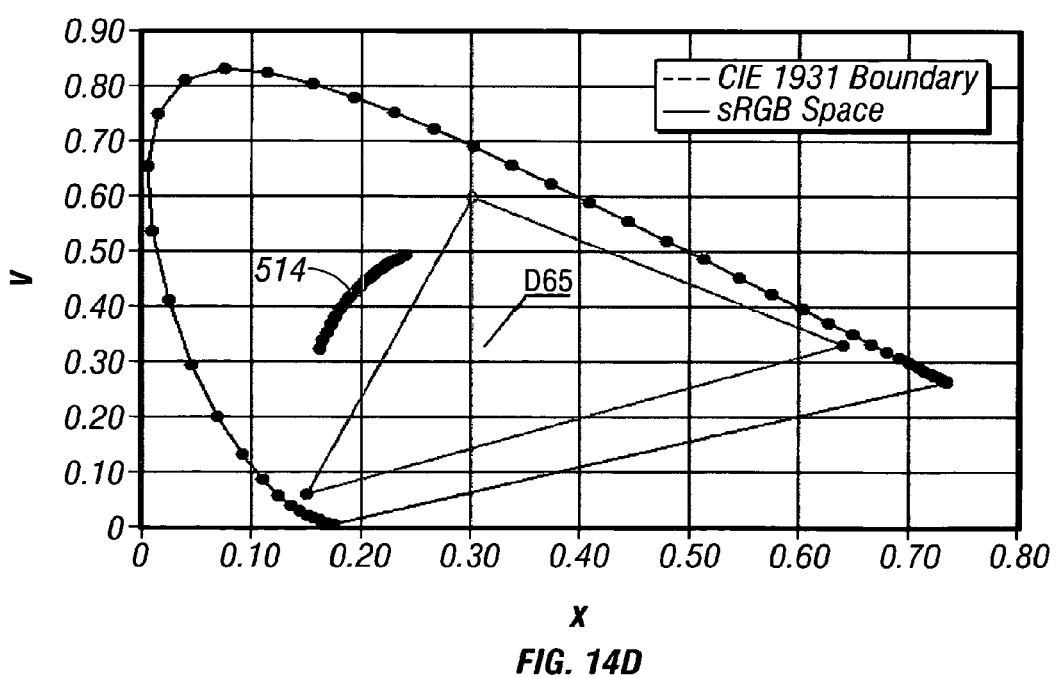
FIG. 14D is a chromaticity diagram illustrating changes in colors for the stack of FIG. 9A when the index of refraction of the spacer material is increased as compared to the spacer used in creating FIG. 14B.

FIGS. 14B and 14C comparatively illustrate the increased effect for higher order colors in greater detail, showing the range of visible color for two different stacks as the angle of view varies from 0° (on-axis) to 25°. FIG. 14B illustrates a chromaticity diagram for a stack having a spacer layer comprising a 3400 Å layer of silicon oxide, yielding an on-axis peak color of second-order green (525 nm). In contrast, FIG. 14C illustrates a chromaticity diagram for a stack having a spacer layer comprising a 1620 Å silicon oxide layer, yielding an on-axis peak color of first-order green (525 nm). It can be seen that over the same variance in the angle of view, the second-order green stack provides significantly more color shift 510 than the color shift 512 of the first-order green stack.

The properties of the interferometric modulator stack 110 can also be varied by varying the composition of the layers contained within. For example, if the spacer layer of FIG. 14B is replaced with a spacer layer comprising a 2500 Å layer of zinc oxide, which has a higher index of refraction than silicon oxide, yielding a stack which has the same on-axis color as the stack of FIG. 14B (second order green at 525 nm). However, it can be seen that when the angle of view varies from 0° (on-axis) to 25°, the variance in color 514 is less than when the spacer layer comprised silicon oxide in FIG. 14B. Thus, in some embodiments, the color shift as a function of angle of view may be reduced by increasing the index of refraction of the spacer layer. Other modifications to the various layers, including the absorber, reflector, and substrate may be made to vary the properties of the optical stack, and multilayer or multicavity structures may also be used to alter the spectral output of the interferometric stack.

In addition, the reflectivity of the two layers may be selected to provide an interferometric modulator which is at least semi-transmissive. The degree of transmissiveness can be altered depending on the desired application. In particular embodiments, only a portion of the interferometric modulator array may be transparent, and the reflective portion may form a desired shape, or vice versa.

Figure 15A:
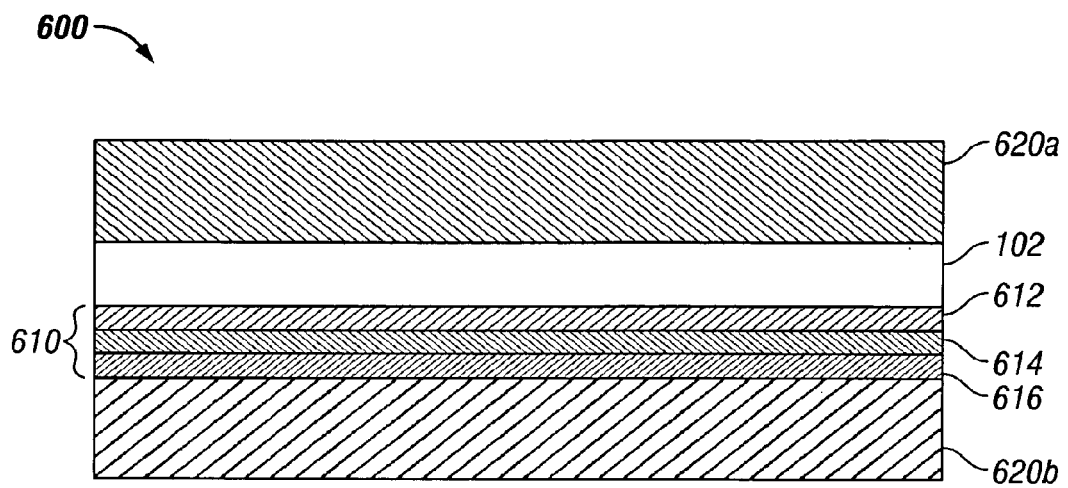
FIGS. 15A and 15B are embodiments of interferometric modulator stacks which are semi-transmissive.
Figure 15B:
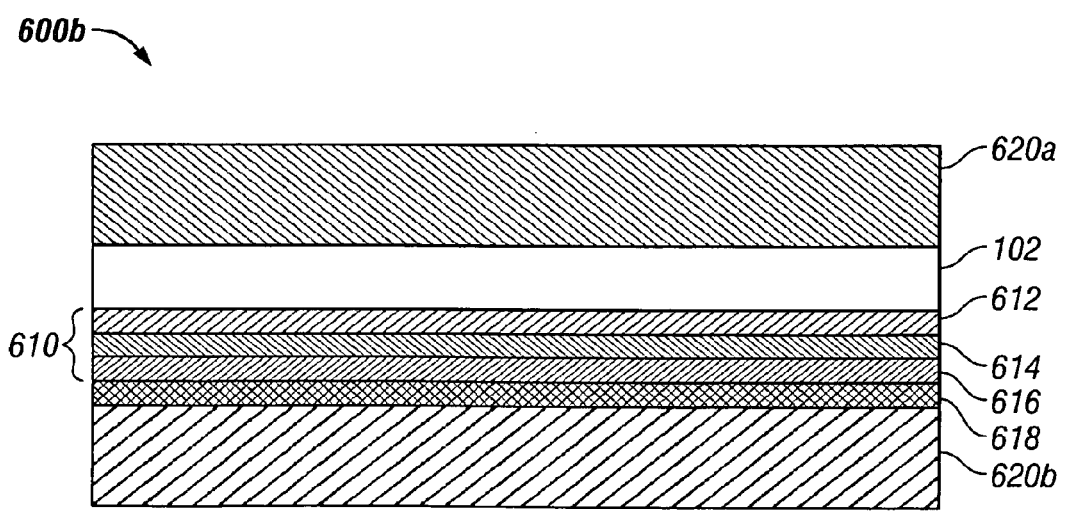

FIG. 15A illustrates one embodiment of a structure 600 which can serve as a transmissive interferometric modulator structure. Structure 600 comprises a substrate 102 having an interferometric stack 610 formed thereon, and textured laminates 620a and 620b formed on either side. The stack includes an 80 Å molybdenum absorber 612, a 4200 Å silicon oxide spacer 614, and a reflector 616 comprising a partially transparent thickness of aluminum, which may in some embodiments be between about 30 Å and 120 Å. In a particular embodiment, the reflector 616 may comprise a 80 Å layer of aluminum, which will have a peak transmission of roughly 20%-25%. FIG. 15B illustrates a slightly modified structure 600b in which the stack 610 includes an additional spacer layer 618 between the reflector 616 and the textured laminate 620b. In certain embodiments, this additional layer 618 may provide additional color control over the device, or may be used on both semi-transparent and reflective interferometric modulator stacks to provide physical protection to the adjacent stack.

Semi-transmissive interferometric modulator structures such as structure 600 reflect specific colors from both the absorber side and the reflector side. As the thickness of the reflector 616 decreases, the saturation of the color reflected from the absorber side decreases, and the saturation of the color reflected from the reflector side increases. In addition to the reflected colors, a color will also be transmitted through the interferometric stack 610. In the above embodiment, the transmitted color is similar to the color reflected from the absorber side, while the color reflected from the reflector side will be approximately complimentary. In certain embodiments, the semi-transmissive interferometric modulator structures may be configured to reflect substantially the same colors from both sides. This may be done, for example, through the use of a symmetric modulator stack, wherein the absorber and the reflector comprise the same materials in the same thickness. For example, one such modulator stack comprises aluminum layers having a thickness between 30 Å and 120 Å on either side of a spacer layer. In such an embodiment, substantially the same color will be reflected from both sides, and the transmitted color may be approximately complimentary.

Figure 15C:
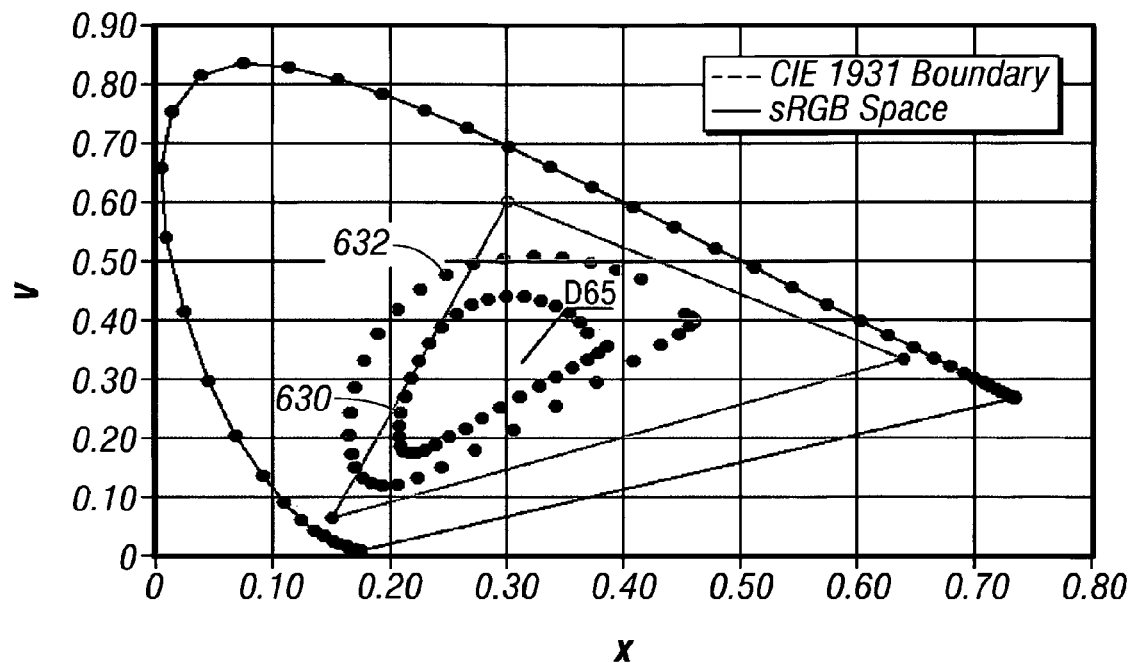
FIG. 15C is a chromaticity diagram which plots the transmitted color and reflected color on the absorber side of the structure of FIG. 15A.
Figure 15D:
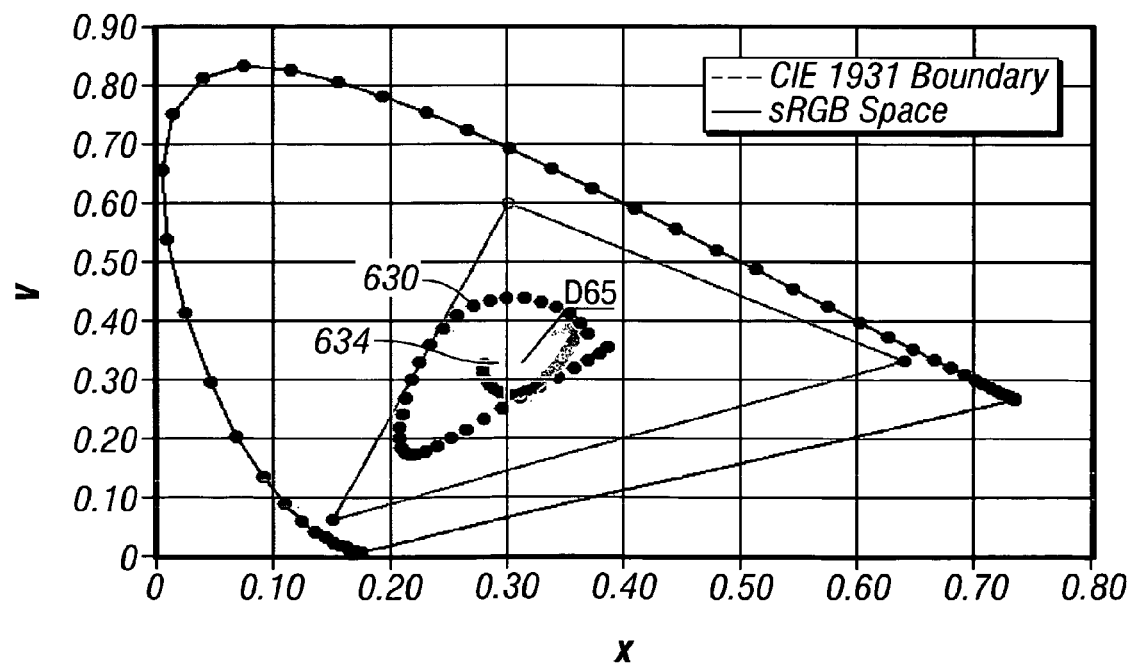
FIG. 15D is a chromaticity diagram which plots the transmitted color and reflected color on the reflector side of the structure of FIG. 15A.

FIG. 15C is a chromaticity diagram illustrating the transmitted color 630 and the reflected color 632 on the absorber side of the device of FIG. 15A as the spacer layer 614 is varied from 2000 Å to 3700 Å. It can be seen that the changes in transmitted color 630 and the reflected color 632 on the absorber side are similar. FIG. 15D is a chromaticity diagram illustrating the transmitted color 630 and the reflected color 634 on the reflector side of the device are roughly complimentary to one another.

A dual-sided interferometric modulator may be provided which comprises a first partially reflective or absorber layer, a first spacer layer defining a first interferometric gap, a reflective layer, a second spacer layer defining a second interferometric gap, and a second partially reflective or absorber layer. Thus, from either side, the dual-sided interferometric modulator functions as described above with respect to a single-sided interferometric modulator. Although the materials and thicknesses may be similar or identical to provide similar optical responses on both sides, the thicknesses or materials may be different in other embodiments to provide different optical responses on either side. In addition, one or both sides of such a dual-sided interferometric modulator may comprise a textured layer as discussed above.

Figure 16:
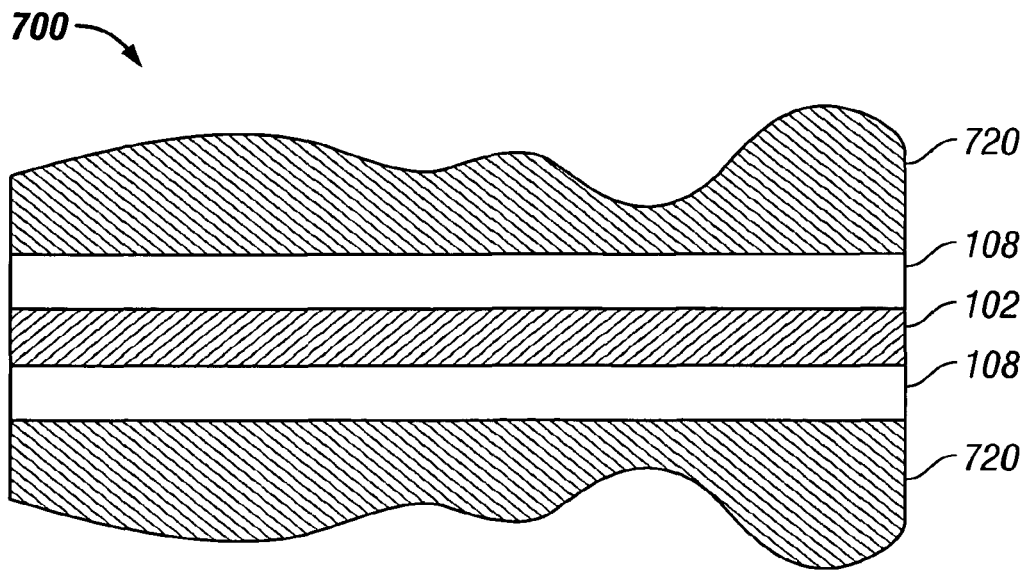
FIG. 16 is a cross section of a dual sided assembly comprising a textured layer on either side of an interferometric modulator array.

In certain embodiments, such as the assembly 700 depicted in FIG. 16, a dual-sided assembly may be provided, comprising a modulator substrate 102, and a textured layer 720 adhered via adhesive layers 108 to either side of the modulator substrate 102. In one embodiment, the modulator substrate may comprise a light-transmissive substrate with a dual-sided interferometric modulator positioned on one side of the modulator substrate. In other embodiments, the modulator substrate may comprise an interferometric modulator array (not shown) on either side of the modulator substrate. In other embodiments, the modulator array may comprise a single semi-transmissive interferometric modulator array on one side of the modulator substrate. Although depicted as comprising a textured layer similar in design and orientation to that of FIG. 13A, it will be understood that the textured layers and orientation of any of FIGS. 13A to 13D, as well as any other suitable textured layer, may be utilized in conjunction with this and the following embodiments.

Figure 17A:
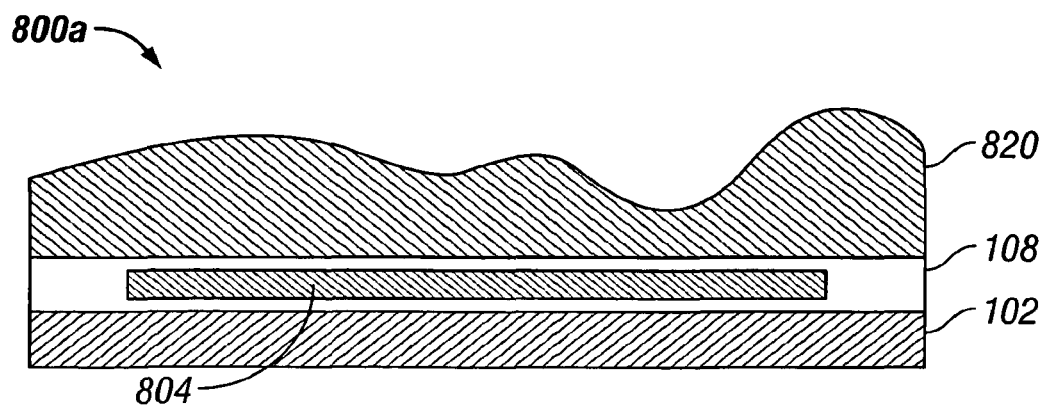
FIGS. 17A-17B are cross sections of assemblies in which objects are suspended within adhesive layers.
Figure 17B:
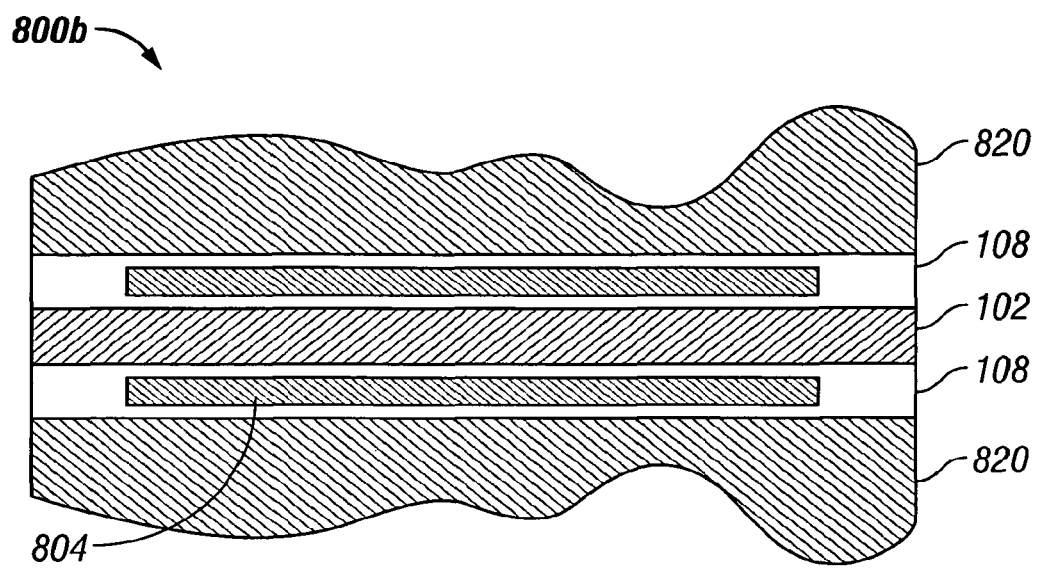

In another embodiment, one or more objects may be suspended in front of the interferometric modulator. In particular embodiments, such as the assembly 800a of FIG. 17A and 800b of FIG. 17B, such objects 804 may be suspended within the adhesive layer(s) 108, or may be suspended against the interior surface of the textured layer(s) 820. In a particular embodiment, these objects may be translucent, such that they can be illuminated from behind by light reflected by the interferometric modulator array. In particular embodiments, these objects may be decorative, semi-transparent, or transparent, and may be any of a wide variety of objects, including but not limited to objects such as microspheres or decorative leaves or paper. In such an embodiment, the illumination of the object 804 may be independent of the angle of view, such that the object is illuminated with a relatively constant color of light while the color of the surrounding area changes as a function of the angle of view.

Figure 18A:
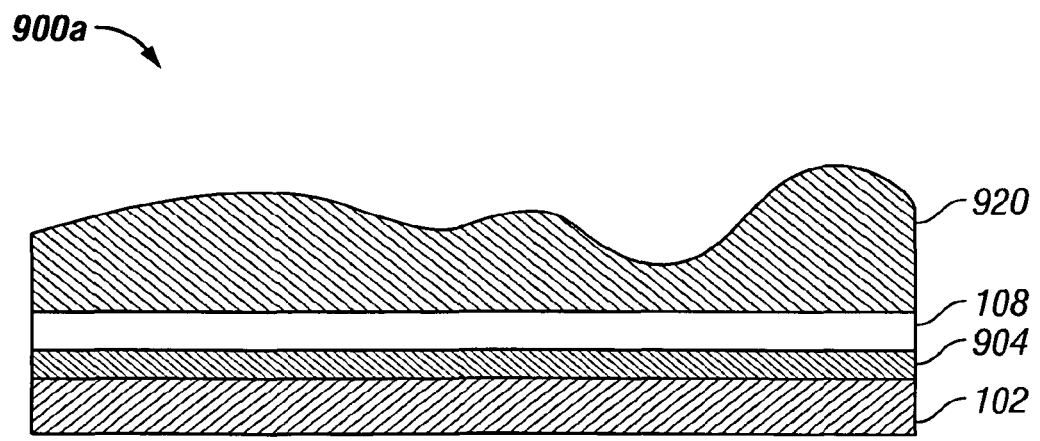
FIG. 18A is a cross section of an assembly comprising an integrated frontlight.
Figure 18B:
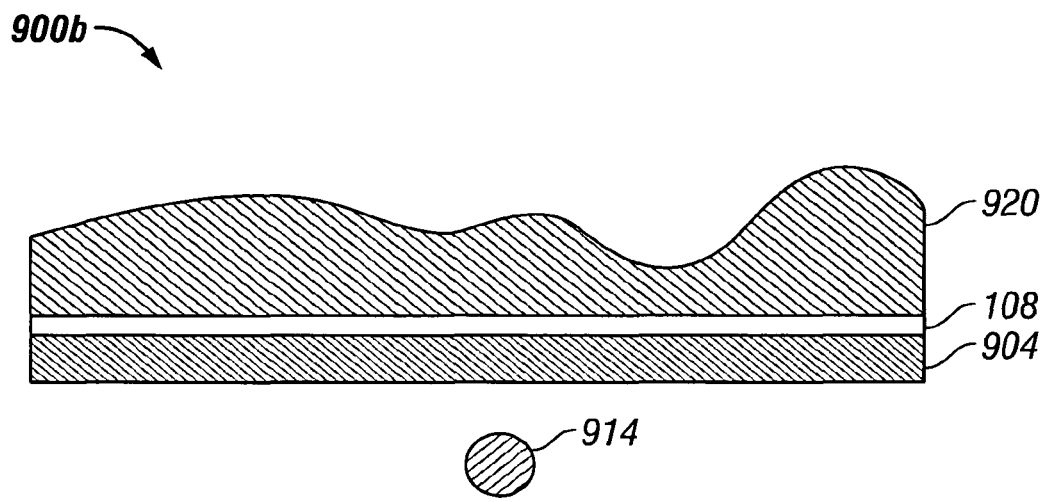
FIG. 18B is a cross section of an assembly comprising a separate backlight.
Figure 18C:
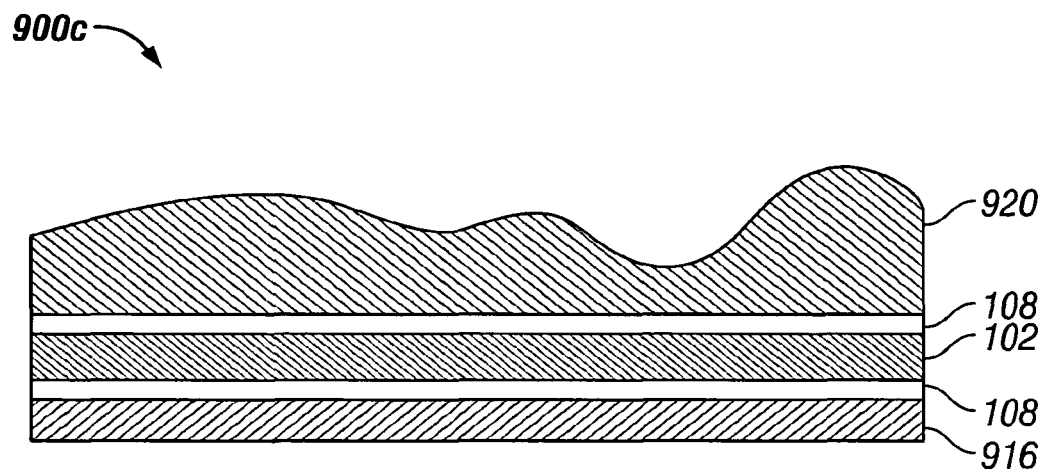
FIG. 18C is a cross section of an assembly comprising an integrated backlight.
Figure 19:
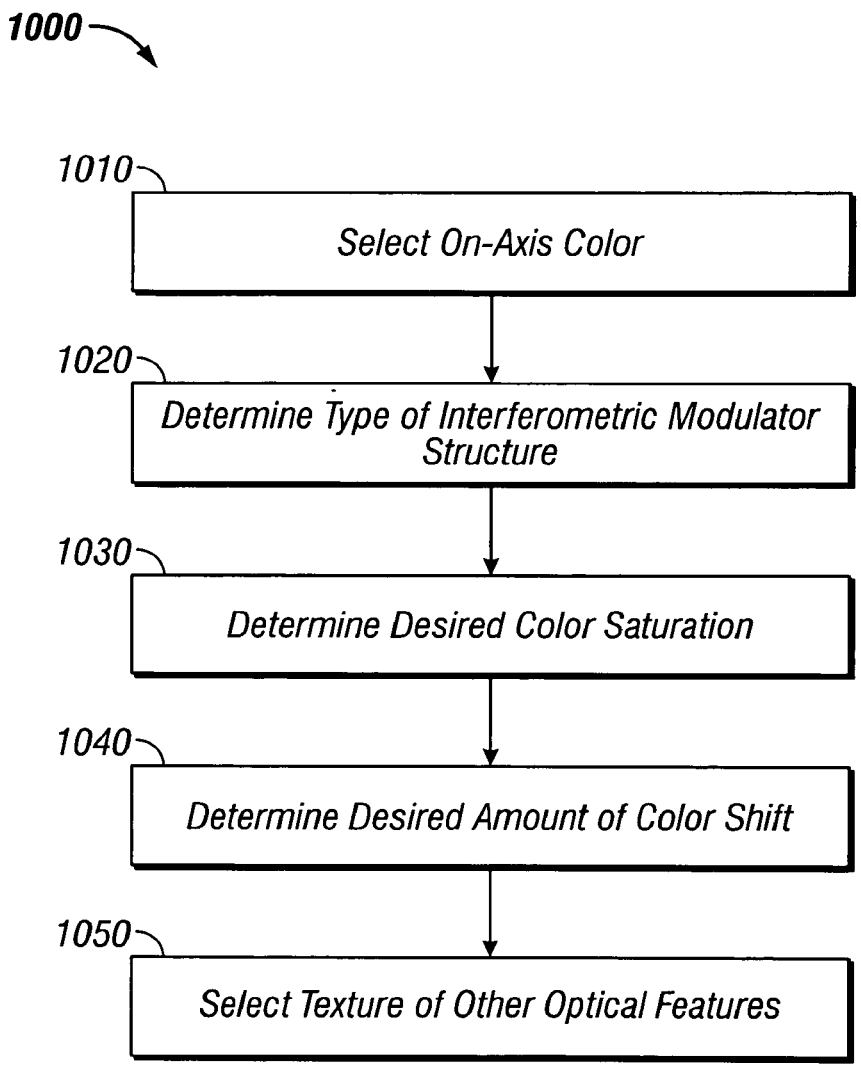
FIG. 19 is a flowchart illustrating an exemplary process for designing an interferometric modulator device comprising a textured layer positioned between the interferometric modulator and a viewer.

In certain embodiments, illumination may be provided to the interferometric modulator array. FIGS. 18A-18C illustrate various embodiments of lighting systems which may be used in conjunction with various assembly structures. In FIG. 18A, it can be seen that assembly 900a includes a frontlight light guiding layer 904 disposed between the adhesive layer 108 and the modulator substrate 102, which may comprise an interferometric modulator or stack located on either side of the substrate and configured such that light scattered or reflected from the frontlight will be modulated by the interferometric modulator or stack and reflected or transmitted to a viewer. In the illustrated embodiment, the light guiding layer 904 is located below textured layer 920 such that the textured layer does not interfere with the operation of the frontlight. In other embodiments, the frontlight may be optically isolated from the substrate 102. In some embodiments, a dual sided device may be provided, as discussed above, with a frontlight guiding layer 904 on either side of the substrate 102.

As will be understood, the frontlight light guiding layer 904 may be configured to transmit light along the length of the layer 904 and may comprise structures such as ink dots, diffusers, and prismatic or holographic films, configured to reflect light towards the interferometric modulator array. In other embodiments, the front light may be configured to reflect light away from the interferometric modulator array, to provide a different effect. The adhesive layer 108 preferably comprises a material which has a lower refractive index than the frontlight layer 904, so as to facilitate propagation of light down the layer 904 via total internal reflection. In certain embodiments, this may be a low-index pressure sensitive adhesive. In other embodiments, the textured layer 920 may comprise a low-index material.

FIG. 18B illustrates an alternate assembly 900b in which the modulator substrate 102 is at least partially light-transmissive, and in which the interferometric modulator array or stack (not shown) is semi-transparent. In such an embodiment, a light source 914 disposed behind the interferometric modulator array or stack may be provided to provide light through the interferometric modulator and illuminate the assembly.

Similarly, FIG. 18C illustrates another assembly suitable for use with a semi-transparent modulator stack or array. In FIG. 18C, it can be seen that assembly 900c is similar in structure to assembly 900b of FIG. 18B, except that the backlight takes the form of a backlight light guiding layer 916 similar to the frontlight light guiding layer 904 of FIG. 18A. The backlight layer 916 is configured to reflect light through the modulator substrate and the semi-transparent interferometric modulator array. The backlight may also serve to increase the light reflected by the interferometric modulator or stack on the side adjacent the backlight, such that the backlight serves essentially as both a backlight transmitting light through the interferometric modulator or stack and a frontlight illuminating the adjacent side of the stack or array.

In certain embodiments, the lighting components described above may be configured to output panchromatic (white) light. In other embodiments, the lighting components may be configured to output monochromatic (colored) light. For example, in certain embodiments, the light source may be configured to output light having a wavelength which corresponds to the on-axis peak wavelength of the interferometric stack or modulator. In such an embodiment, the amount of light reflected by the interferometric stack or modulator tapers off as the viewing angle increases and the peak reflected wavelength moves away from the wavelength of the light source. In another embodiment, a wavelength other than the on-axis peak of an interferometric modulator or stack may be used, such as a wavelength corresponding to the peak at a particular off-axis viewing angle, such that brightness increases as the viewer moves away from the normal.

In other embodiments, or in conjunction with the above embodiments, colored or tinted layers may be used to provide similar effects. For example, a layer which transmits light of certain wavelengths more than light of other wavelengths can be used to emphasize or minimize the colors reflected at particular view angles.

In certain embodiments, a modulator substrate comprising an interferometric modulator array may be provided as a component to be integrated with a desired adhesive and textured layer by an end user. Because the pattern and colors to be reflected by the assembly can be significantly influenced by the composition, size and shape of other components, an end user can have a great deal of freedom in configuring the assembly to provide a desired optical output. In further embodiments, the modulator substrate may be provided in a package along with information regarding suitable components to complete an assembly, as well as instructions for assembling the same. The provided information may include, for example, the range of potential colors which may be reflected by the modulator substrate as sold, as well as information regarding more limited ranges which can be obtained with particular adhesives or textured layers. The composition of the substantially constant illumination which may be provided to suspended objects may also be included in this information. Furthermore, information regarding the suitability of particular components for given uses may also be included, such as information regarding adhesives or textured layers which may be more suitable for the rigors of outdoor use, for example.

In further embodiments, the provided package may include the adhesive to be used. This adhesive may come packaged separately, or may come pre-applied to the modulator substrate, and may be protected, for example, by a peel-off layer or other protective packaging. The use of a separately packaged adhesive rather than a pre-applied adhesive may be desirable in embodiments in which significantly textured layers are to be used, and no air gap between the textured layers and the substrate is desirable. In other further embodiments, this modulator substrate may include integrated lighting, such as a frontlight or backlight light guiding layer. In other embodiments, a suitable textured layer may be provided.

One embodiment of a process flow 1000 for designing a decorative interferometric modulator device may proceed as follows. The process begins at a step 1010 wherein an on-axis color may be selected. As the on-axis color represents the shortest optical path for an interferometric modulator stack (or for a collapsed interferometric modulator) the on-axis color will define one bound of possible colors generated by the interferometric modulator structure and can be used to define suitable composition and thicknesses of the various layers. As will be discussed in greater detail below, however, subsequent design considerations may cause the choice of on-axis color to be revisited or modified.

The process then moves to a step 1020 where the type of interferometric modulator structure is determined. If the device is to be backlit, a semi-transparent interferometric modulator will be used. If the device is to be viewed from multiple sides, a semi-transparent interferometric modulator or a dual-sided interferometric modulator will be used. If the device is to be viewed from only a single side, and need not be backlit, a single-sided interferometric modulator will typically be used, although dual sided or semi-transparent interferometric modulators may also be used.

The process then moves to a step 1030 where the desired color saturation is determined. If less color saturation is desired, a first order color of the selected on-axis color will be used. If greater color saturation is desired, a second or higher order of the selected on-axis color is used.

The process then moves to a step 1040 where the desired amount of color shift is determined. If large amounts of color shift are desired, surface texture features having a high profile and surfaces at steep angles to the interferometric stack or modulator may be used, and discretely viewable texture features may be used. In addition, a spacer material having a low refractive index may be used. If color shift is very important, a modification of the selected color to pick a color which is near a maximum of color variance due to view angle or spacer thickness may be used. If low amounts of color shift are desired, the opposite design choices may be made, using optical features with low profiles and shallow angles, using a spacer material with a high refractive index, and using colors near minimums of color variance. In addition, it may be desirable to use embedded features within the laminate or other textured layer, rather than surface features.

Finally, the process moves to a step 1050 where the texture or optical features are selected to provide the desired color variation effect. If discrete areas of substantially constant color are desired, features having planar surfaces may be used, such as the prismatic strips discussed above. If gradual changes in color are desired, features such as the spherical lens features discussed above may be used, or rounded random patterns.

Although the above process flow sets forth exemplary steps in the design of a decorative feature, it will be understood that other steps and design decisions may be made, and that certain of the above steps may be left out. For example, the use of an active interferometric modulator structure may be contemplated, along with the details of such a structure.

Figure 20:
FIG. 20 is an overhead color photograph of a textured glass layer overlying a modulator substrate having an interferometric modulator formed thereon.
Figure 21:
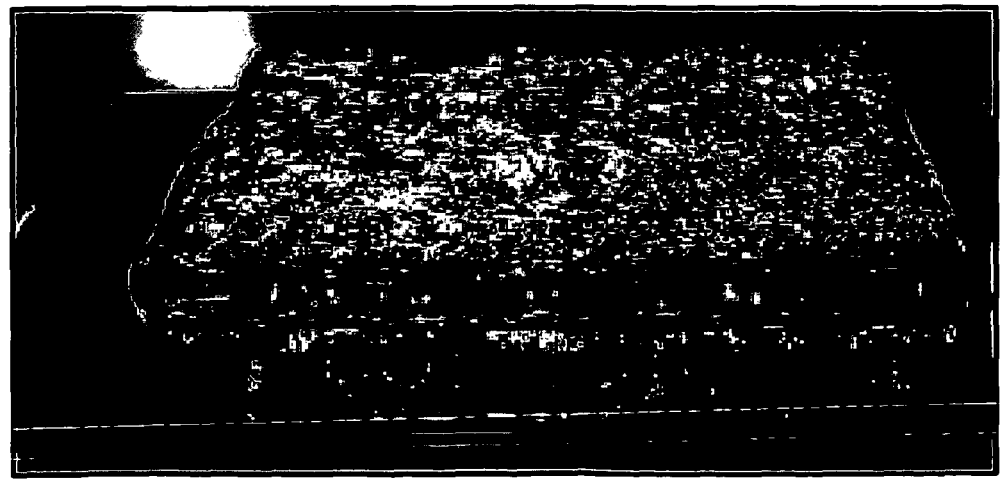
FIG. 21 is a color photograph of the textured glass layer and interferometric modulator substrate of FIG. 20 taken at a different angle.
Figure 22:
FIG. 22 is an overhead color photograph of a textured glass layer overlying a tiled modulator substrate.

FIGS. 20-22 are color photographs illustrating the color shift characteristics described above. FIG. 20 is an overhead color photograph of a textured glass layer overlying a modulator substrate having an interferometric modulator formed thereon, the picture taken at an angle substantially parallel to the normal of the modulator substrate. In this embodiment, the interferometric modulator is formed with a second order red and third order blue in combination. FIG. 21 is a color photograph of the textured glass layer and interferometric modulator substrate of FIG. 20 taken at an angle almost parallel to the modulator substrate. Note that the perceived color depends on the angle of the light with respect to the viewer as well as the angle of the viewer with respect to the surfaces of the textured glass layer and the interferometric modulator. For example, a reflection from the edge of the textured glass appears as yellow, the colors viewed through the edge of the textured glass shows color flecks of green and purple, while the colors seen from the top surface of the textured glass shows varying shades of yellows, golds, reds, greens, and purple. FIG. 22 is an overhead color photograph of a textured glass layer overlying a tiled modulator substrate, illustrating the blurring of the boundaries of the interferometric modulator tiles.

While the above detailed description has shown, described and pointed out novel features of the invention as applied to various embodiments, it will be understood that various omissions, substitutions, and changes in the form and details of the device or process illustrated may be made by those skilled in the art without departing from the spirit of the invention. For example, a textured layer of the type discussed above may be used in conjunction with any display device wherein the reflected color varies as a function of the angle of view. As will be recognized, the present invention may be embodied within a form that does not provide all of the features and benefits set forth herein, as some features may be used or practiced separately from others.

What is claimed is:

1. An optical structure, comprising:
    a display element, wherein the wavelengths of light reflected by the display element are a function of the angle of view; and
    an overlying layer including a textured surface which refracts light in a substantially random pattern, wherein said textured surface forms a boundary between a first material having a first index of refraction and a second material having a second index of refraction, and wherein light reflected by the display element is refracted at the textured surface to alter the effective angle of view over the display element.

2. The optical structure of claim 1, wherein the textured surface includes at least one optical feature having a curved surface.

3. The optical structure of claim 1, wherein the display element includes:
    a reflective layer; and
    an absorber layer which is at least partially transmissive to incident light, wherein the absorber layer is located between the reflective layer and the overlying layer.

4. The optical structure of claim 1, wherein the textured surface is located on a side of the overlying layer facing the display element.

5. The optical structure of claim 1, wherein the textured surface is located on a side of the overlying layer facing away from the display element.

6. The optical structure of claim 1, wherein the textured surface is disposed within the overlying layer.

7. The optical structure of claim 1, wherein the display element is configured such that an increase in the angle of view will result in color shift as the angle of view increases.

8. The optical structure of claim 1, wherein the textured surface includes a substantially planar region oriented at a non-zero angle to the display element.

9. The optical structure of claim 1, wherein the display element includes an interferometric modulator stack, wherein the interferometric modulator stack includes:
    an absorber layer which is at least partially transmissive to incident light;
    a reflective layer fixed relative to the absorber layer; and
    a spacer layer disposed between the absorber layer and the reflective layer and defining an interferometric gap within the interferometric modulator stack.

10. The optical structure of claim 9, wherein the absorber and the reflector include substantially the same material.

11. The optical structure of claim 9, wherein the reflective layer is at least partially transmissive to incident light.

12. The optical structure of claim 9, wherein the spacer layer has a substantially constant thickness.

13. A method of fabricating an optical structure, comprising:
    providing a display element, wherein the wavelengths of light reflected by the display element are a function of the angle of view; and
    overlaying the display element with a layer having a textured surface which refracts light in a substantially random pattern, wherein said textured surface forms a boundary between a first material having a first index of refraction and a second material having a second index of refraction, and wherein light reflected by the display element is refracted at the textured surface to alter the effective angle of view over the display element.

14. The method of claim 13, wherein the textured surface includes at least one optical feature having a curved surface.

15. The method of claim 13, wherein the display element includes:
    a reflective layer; and
    an absorber layer which is at least partially transmissive to incident light, wherein the absorber layer is located between the reflective layer and the overlying layer.

16. The method of claim 13, wherein the display element is configured such that an increase in the angle of view will result in color shift as the angle of view increases.

17. The method of claim 13, wherein the textured surface includes a substantially planar region oriented at a non-zero angle to the display element.

* * * * *